US012273496B2

(12) United States Patent
Morikawa

(10) Patent No.: US 12,273,496 B2
(45) Date of Patent: Apr. 8, 2025

(54) PRINTING DEVICE PRINTING A PLURALITY OF PATCHES AND MEASURING EACH PATCH A PLURALITY OF TIMES

(71) Applicant: BROTHER KOGYO KABUSHIKI KAISHA, Nagoya (JP)

(72) Inventor: Shota Morikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/350,090

(22) Filed: Jul. 11, 2023

(65) Prior Publication Data

US 2024/0040061 A1 Feb. 1, 2024

(30) Foreign Application Priority Data

Jul. 29, 2022 (JP) ................................ 2022-121574

(51) Int. Cl.
*H04N 1/60* (2006.01)

(52) U.S. Cl.
CPC ................................ *H04N 1/6033* (2013.01)

(58) Field of Classification Search
CPC ................................................... H04N 1/6033
See application file for complete search history.

(56) References Cited

U.S. PATENT DOCUMENTS 7,006,246 B1 * 2/2006 Nakajima .......... H04N 1/00002 358/1.9
8,977,143 B2 * 3/2015 Zaima ................. H04N 1/6033 399/15
2005/0280846 A1 * 12/2005 Ichitani ................ H04N 1/6058 358/1.9
2007/0030525 A1 * 2/2007 Ono ..................... H04N 1/6033 358/1.9
2007/0229870 A1 * 10/2007 Doi ...................... H04N 1/6033 358/1.9
2015/0131090 A1 * 5/2015 Osumi .................. G01J 3/1256 356/300
2016/0370230 A1 * 12/2016 Nishimura ................ G01J 3/51
2017/0054878 A1 * 2/2017 Takemura ............ H04N 1/6008

FOREIGN PATENT DOCUMENTS

JP 2008-200894 A 9/2008
JP 2010-157920 A 7/2010

* cited by examiner

*Primary Examiner* — Barbara D Reinier
(74) *Attorney, Agent, or Firm* — Scully, Scott, Murphy & Presser, P.C.

(57) ABSTRACT

A printing device includes a print head, a measuring member, and a controller. The print head prints a patch chart on a print medium. The patch chart includes a plurality of first patches and one or more second patches. Each first patch has a predetermined color. Each second patch has a user specified color represented by an input color value. The measuring member measures a color of a patch. The controller performs a second-patch measurement process to control the measuring member to measure a color of each second patch a plurality of times to acquire a plurality of color values for the each second patch. The controller calculates an average value of at least two of the plurality of color values for the each second patch, and generates a table correlating an input color value with the average value as a measured color value for the each second patch.

12 Claims, 18 Drawing Sheets

| No. | SECOND PATCH | THE NUMBER OF PATCHES | STARTING POSITION x | STARTING POSITION y | ENDING POSITION x | ENDING POSITION y |
|---|---|---|---|---|---|---|
| 1 | ABSENT | 36 | 10 | 10 | 13 | 100 |
| 2 | ABSENT | 36 | 16 | 10 | 20 | 100 |
| … | … | … | … | … | … | … |
| … | … | … | … | … | … | … |
| 22 | PRESENT | 36 | 125 | 12 | 129 | 102 |
| … | … | … | … | … | … | … |

| No. | TYPE | POSITION | COLOR VALUE | | | MEASURED COLOR VALUE | | |
|---|---|---|---|---|---|---|---|---|
| | | | R | G | B | L | a | b |
| 1 | FIRST PATCH | 1ST COLUMN 1ST ROW | 0 | 0 | 0 | | | |
| 2 | FIRST PATCH | 1ST COLUMN 2ND ROW | 7 | 0 | 0 | | | |
| ... | ... | ... | ... | ... | ... | ... | ... | ... |
| 730 | SECOND PATCH | 22-TH COLUMN 1ST ROW | 255 | 160 | 32 | | | |
| 731 | SECOND PATCH | 22-TH COLUMN 2ND ROW | 255 | 176 | 80 | | | |
| ... | ... | ... | ... | ... | ... | ... | ... | ... |

PRINTING DEVICE PRINTING A PLURALITY OF PATCHES AND MEASURING EACH PATCH A PLURALITY OF TIMES

REFERENCE TO RELATED APPLICATIONS

This application claims priority from Japanese Patent Application No. 2022-121574 filed on Jul. 29, 2022. The entire content of the priority application is incorporated herein by reference.

BACKGROUND ART

An information processing device known in the art is one example of a conventional colorimetry system for measuring colors in printed matter. The conventional information processing device extracts all colors represented by target data to be printed and acquires the occupancy ratio of each color in the printing area. The information processing device then generates data for calibration patch images based on these occupancy ratios and controls a printer to print the calibration patch images. Next, the information processing device uses a colorimeter to measure the colors of the printed calibration patch images and calibrates the image data for the target image based on this colorimetric data.

DESCRIPTION

The conventional information processing device described above measures printed calibration patches with a colorimeter all in the same manner and calibrates the image data to be printed on the basis of this colorimetric data. However, using the same method to measure colors of all calibration patch images with the colorimeter may decrease the accuracy of color measurements, resulting in reduced accuracy of color calibration.

In view of the foregoing, it is an object of the present disclosure to provide a printing device, a color measurement method, and a color measurement program capable of improving the accuracy of color calibration.

In order to attain the above and other object, the present disclosure provides A printing device. The printing device includes a print head, a measuring member, and a controller. The print head is configured to print a patch chart on a print medium. The patch chart includes a plurality of patches including a plurality of first patches and one or more second patches. Each first patch has a predetermined color. Each second patch has a user specified color represented by an input color value. The measuring member is configured to measure a color of a patch. The controller is configured to perform: a second-patch measurement process to control the measuring member to measure a color of each second patch a plurality of times to acquire a plurality of color values for the each second patch; calculating an average value of at least two of the plurality of color values for the each second patch; and generating a table correlating an input color value with the average value as a measured color value for the each second patch.

According to another aspect, the disclosure provides a method for measuring colors of a plurality of patches included in a patch chart. The plurality of patches includes a plurality of first patches and one or more second patches. Each first patch has a predetermined color. Each second patch has a user specified color represented by an input color value. The method includes: performing a second-patch measurement process to control the measuring member to measure a color of each second patch a plurality of times to acquire a plurality of color values for the each second patch; calculating an average value of at least two of the plurality of color values for the each second patch; and generating a table correlating an input color value with the average value as a measured color value for the each second patch.

According to still another aspect, the disclosure provides a non-transitory computer readable storage medium storing a set of program instructions for a printing device. The printing device includes: a print head configured to print a patch chart on a print medium, the patch chart including a plurality of patches including a plurality of first patches and one or more second patches, each first patch having a predetermined color, each second patch having a user specified color represented by an input color value; and a measuring member configured to measure a color of a patch. The set of program instructions includes: a second-patch measurement process to control the measuring member to measure a color of each second patch a plurality of times to acquire a plurality of color values for the each second patch; calculating an average value of at least two of the plurality of color values for the each second patch; and generating a table correlating an input color value with the average value as a measured color value for the each second patch.

In the above structures, the accuracy of color measurements can be improved.

FIG. 5 is an example of a patch column table storing patch column information.

FIG. 7 is an example of a table correlating color values of patches with measured color values.

The embodiments of the present disclosure will be described while referring to the accompanied drawings. The following embodiments are just examples and the present invention is not limited to these embodiments. The embodiments can be modified without departing from the scope of the invention. For example, some components and/or steps can be added, and/or deleted.

First Embodiment

Figure 1:
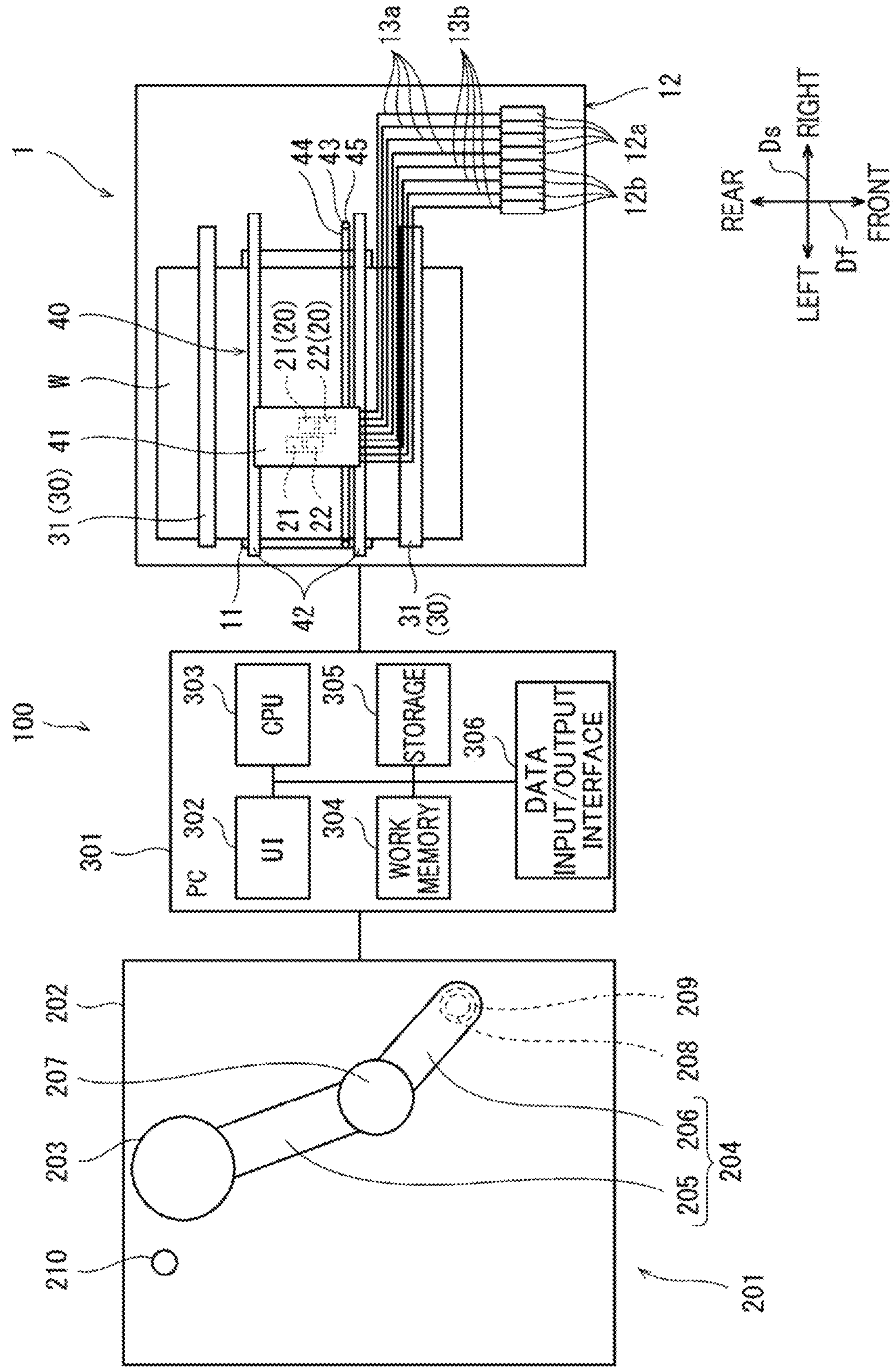
FIG. 1 is a plan view showing a colorimetry system.

FIG. 1 is a plan view showing a colorimetry system 100 according to an embodiment of the present disclosure. In FIG. 1, a first direction Ds, a second direction Df, and a third direction are each orthogonal to the others. In this embodiment, the first direction Ds is the moving direction of a carriage 41 described later, the second direction Df is the conveying direction of a print medium W described later, and the third direction is the up-down direction, for example. Thus, in the following description, Ds will be called the moving direction, Df will be called the conveying direction, and the third direction will be called the up-down direction.

As shown in FIG. 1, the colorimetry system 100 includes a printing device 1, which is an inkjet printer that prints images on print media W such as printing paper; a colorimetric device 201 provided separately from the printing device 1; and a personal computer 301.

The printing device 1 is a serial printer, for example. The printing device 1 is provided with a plurality of ejection heads 20 (see FIG. 2), a platen 11, a plurality of tanks 12, a conveying device 30, and a scanning device 40. However, the printing device 1 may also be configured as a line head printer. In this case, the scanning device 40 is omitted from the printing device 1, and the ejection heads 20 are immobile and have a length in the moving direction Ds greater than the printing area on the print medium W.

The ejection heads 20 use ink in primary colors (described later) to print images on print media W based on image data. The image data includes color values (input color values). In this example, each color value indicates a color and includes component values represented by RGB values in the RGB color space, i.e., as color coordinates in a device-dependent color space. The RGB values express a single color through a combination of a red color value, a green color value, and a blue color value, each of which represents one of a possible 256 gradations (0-255).

The ejection heads 20 print a patch chart PT described later (see FIG. 4) on the print media W. In the present embodiment, the ejection heads 20 correspond to the print engine (or printing unit). The ejection heads 20 include two first ejection heads 21, and two second ejection heads 22, for example. The platen 11 has a flat top surface and defines the distance between a print medium W placed on this top surface and the bottom surface of the ejection heads 20 disposed in opposition to this top surface. The tanks 12 are containers for storing ink. The number of tanks 12 is equal to or greater than the number of ink types. For example, the tanks 12 include four first tanks 12*a* that store ink in respective ones of the four primary colors, and one or a plurality of second tanks 12*b* that store ink in special colors.

Examples of primary color inks are cyan ink, yellow ink, magenta ink, and black ink. Special color inks have different colors from the primary colors. Examples of special color inks are red ink, green ink, and blue ink.

The first tanks 12*a* store ink in the primary colors and communicate with the first ejection heads 21 through first channels 13*a*. Ink in the primary colors is supplied from the first tanks 12*a* to the first ejection heads 21 via the first channels 13*a*. The second tanks 12*b* communicate with the second ejection heads 22 via second channels 13*b*. When the second tanks 12*b* store ink in special colors, the special color inks flow from the second tanks 12*b* into the second channels 13*b*, filling the second channels 13*b*. From the second channels 13*b*, the special color inks are supplied to the ejection heads 20. Before ink in special colors is stored in the second tanks 12*b*, the second tanks 12*b* are filled with a storage solution. The first channels 13*a* and the second channels 13*b* are rubber or plastic tubes, for example, which are preferably resistant to kinking.

The conveying device 30 has two sets of conveying rollers 31, and a conveying motor 32 (see FIG. 2), for example. The two sets of conveying rollers 31 are arranged so that the platen 11 is located between the two sets of conveying rollers 31 in the conveying direction Df (front-rear direction). The conveying rollers 31 have axes aligned in the moving direction Ds. In each set, the conveying rollers 31 are aligned in the up-down direction Dz and are configured to nip a print medium W therebetween. One conveying roller 31 in each set is connected to the conveying motor 32. The conveying rollers 31 rotate about their axes when driven by the conveying motor 32 and convey a print medium W over the platen 11 in the conveying direction Df.

The scanning device 40 has a carriage 41, a pair of guide rails 42, a scanning motor 43, and an endless belt 44. The guide rails 42 extend in the moving direction Ds over the platen 11 so that the ejection heads 20 are interposed between the guide rails 42 in the conveying direction Df. The carriage 41 is supported on the guide rails 42 to be movable in the moving direction Ds. The carriage 41 supports the ejection heads 20. The endless belt 44 extends in the moving direction Ds and is attached to the carriage 41. The endless belt 44 is also attached to the scanning motor 43 via a pulley 45. When the scanning motor 43 is driven, the endless belt 44 circulates and the carriage 41 reciprocates in the moving direction Ds along the guide rails 42. In this way, the carriage 41 moves the ejection heads 20 in the moving direction Ds.

The colorimetric device 201 is connected to the personal computer 301 via a network, such as a wired or wireless LAN. The colorimetric device 201 has a base 202 and an arm 204. The base 202 is disposed at a prescribed position in the colorimetry system 100 to a side of the printing device 1, for example. A white reference 210 is provided on the base 202. A color measuring unit 208 described later uses the white reference 210 in a process for adjusting the measurement accuracy for color values (hereinafter also called “calibration process” or “calibration”).

The white reference 210 is disposed in an area that the color measuring unit 208 can measure. For example, the white reference 210 is located within the range in the moving direction Ds within which the color measuring unit 208 can be moved by the arm 204 and within the range in the up-down direction within which the color measuring unit 208 oppose and can measure the white reference 210. The white reference 210 has a predetermined color such that the color measuring unit 208 outputs a predetermined color value when the color measuring unit 208 measures a color of the white reference 210 under a specific measuring condition. Here, the predetermined color value has component values expressed by color coordinates in a device-independent color space, such as L*a*b* values. During the calibration process, the color measuring unit 208 is controlled to measure the color of the white reference 210 to acquire a measured color value (or a colorimetric value) having components values represented in the L*a*b*. The predetermined color value for the white reference 210 is then acquired from a storage and, together with the measured color value and color measuring conditions described later, are used to calibrate the measuring precision of the color measuring unit 208.

The arm 204 has a first link 205 and a second link 206, for example. The proximal end of the first link 205 is connected to the base 202 by a first rotary joint 203, for example. The first rotary joint 203 has an actuator, such as a motor, which rotates the arm 204 relative to the base 202 about a central axis aligned in the up-down direction. The proximal end of the second link 206 is connected to the distal end of the first link 205 by a second rotary joint 207. The second rotary joint 207 has an actuator, such as a motor, which rotates the second link 206 relative to the first link 205 about a central axis aligned in the up-down direction. Additionally, the distal end of the second link 206 is connected to the color measuring unit 208 by a prismatic joint 209, for example. The prismatic joint 209 has a linear actuator, such as a motor or solenoid, which moves the color measuring unit 208 up and down relative to the second link 206. With this configuration, the arm 204 can move the color measuring unit 208 three-dimensionally.

The color measuring unit 208 is a spectrophotometer and colorimeter, for example, and has a light-emitting element and a light-receiving element which have respectively the same structures as a light-emitting element 211 (FIG. 12) and a light-receiving element 212 (FIG. 12) described later. The light-emitting element (211) is a light source, such as an illuminant D65, C, or A, and irradiates light onto patches P (see FIG. 4) formed on a print medium W. The light-receiving element (212) receives light irradiated from the light-emitting element (211) and reflected off the patches P. The color measuring unit 208 measures the colors of patches P based on light received by the light-receiving element (212) to acquire measured color values (colorimetric values). Each colorimetric value is expressed as a color value having component values, that is, color coordinates in a device-independent color space such as Lab values in the L*a*b* color space or XYZ values in the XYZ color space.

The personal computer 301 is connected to the printing device 1 and the colorimetric device 201 via a network, such as a wired or wireless LAN. The personal computer 301 is provided with a user interface 302, a CPU 303, a work memory 304, a storage 305, and a data input/output interface 306. The user interface 302 performs processes related to input from the user and displays for the user. The user interface 302 includes input devices such as a keyboard and mouse, and display devices such as a display. The storage 305 is a hard disk, for example. The CPU 303 performs various processes according to programs stored in the storage 305. The work memory 304 is used as a work area when the CPU 303 performs these processes. The data input/output interface 306 is an interface for inputting and outputting image data as printing target data. The user can use the personal computer 301 and user interface 302 to send instructions to the printing device 1 for printing a patch chart PT (see FIG. 4).

Figure 2:
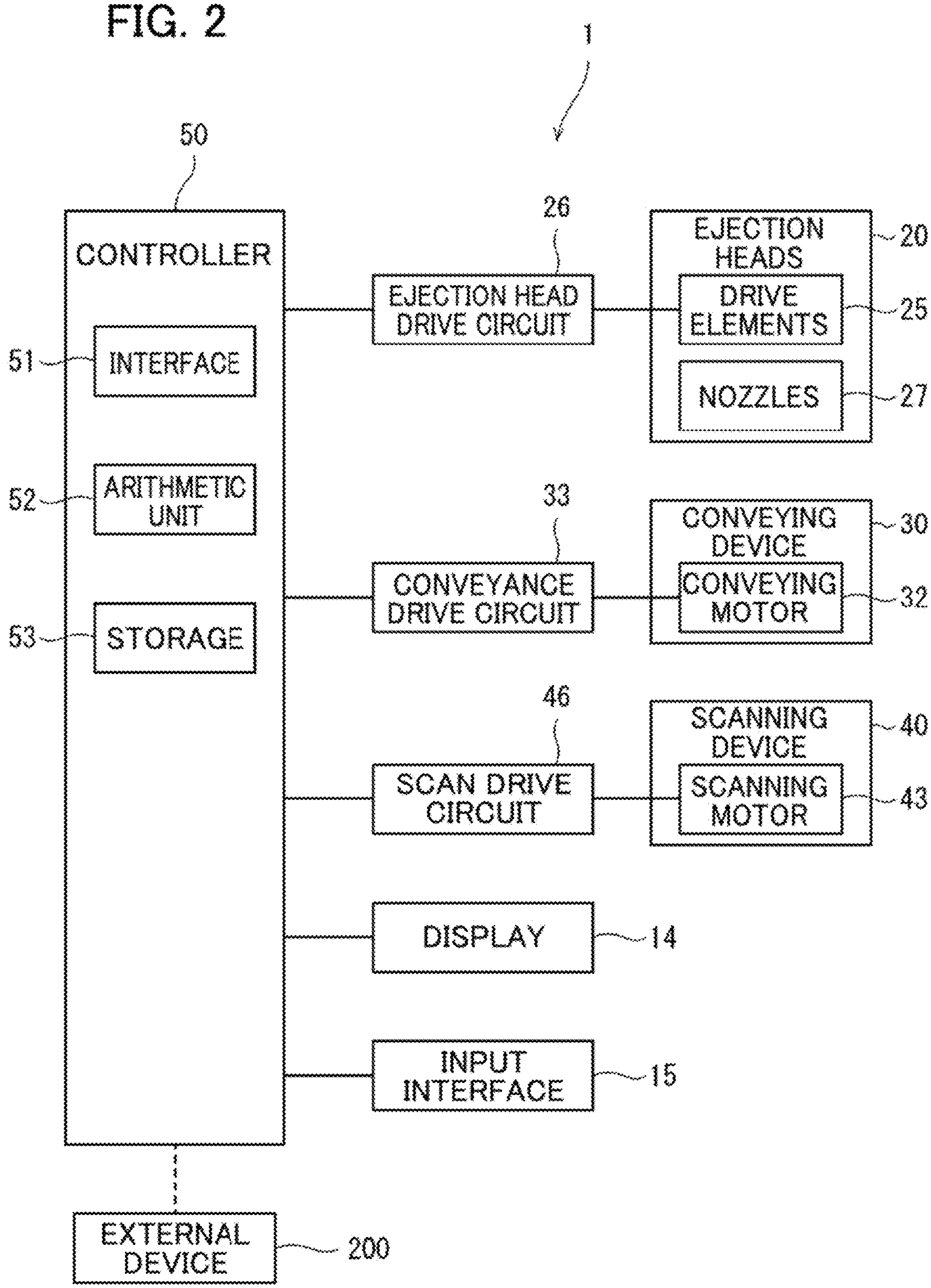
FIG. 2 is a block diagram showing a configuration of a control system of a printing device shown in FIG. 1.

FIG. 2 is a block diagram showing the configuration of the control system in the printing device 1 shown in FIG. 1. As shown in FIG. 2, the ejection heads 20 have a plurality of drive elements 25. The drive elements 25 may be piezoelectric elements, heating elements, electrostatic actuators, and the like. The drive elements 25 are provided for respective nozzles 27 formed in the ejection heads 20 and apply pressure to the ink to eject ink droplets from the corresponding nozzles 27.

The printing device 1 is further provided with a display 14, an input interface 15, and a controller 50. The controller 50 has an interface 51, an arithmetic unit 52, and a storage 53. The interface 51 receives image data and other various data from an external device 200. The external device 200 may be a computer, a camera, a communication network, a storage medium, a display, a printer, or the like. The image data is raster data and the like representing an image to be printed on print media W. The image data includes information on printing conditions such as the type of print medium W and the like. The controller 50 may be configured as a standalone device, or a plurality of devices in a distributed arrangement. In the latter case, the devices interact with each other to operate the printing device 1.

Figure 4:
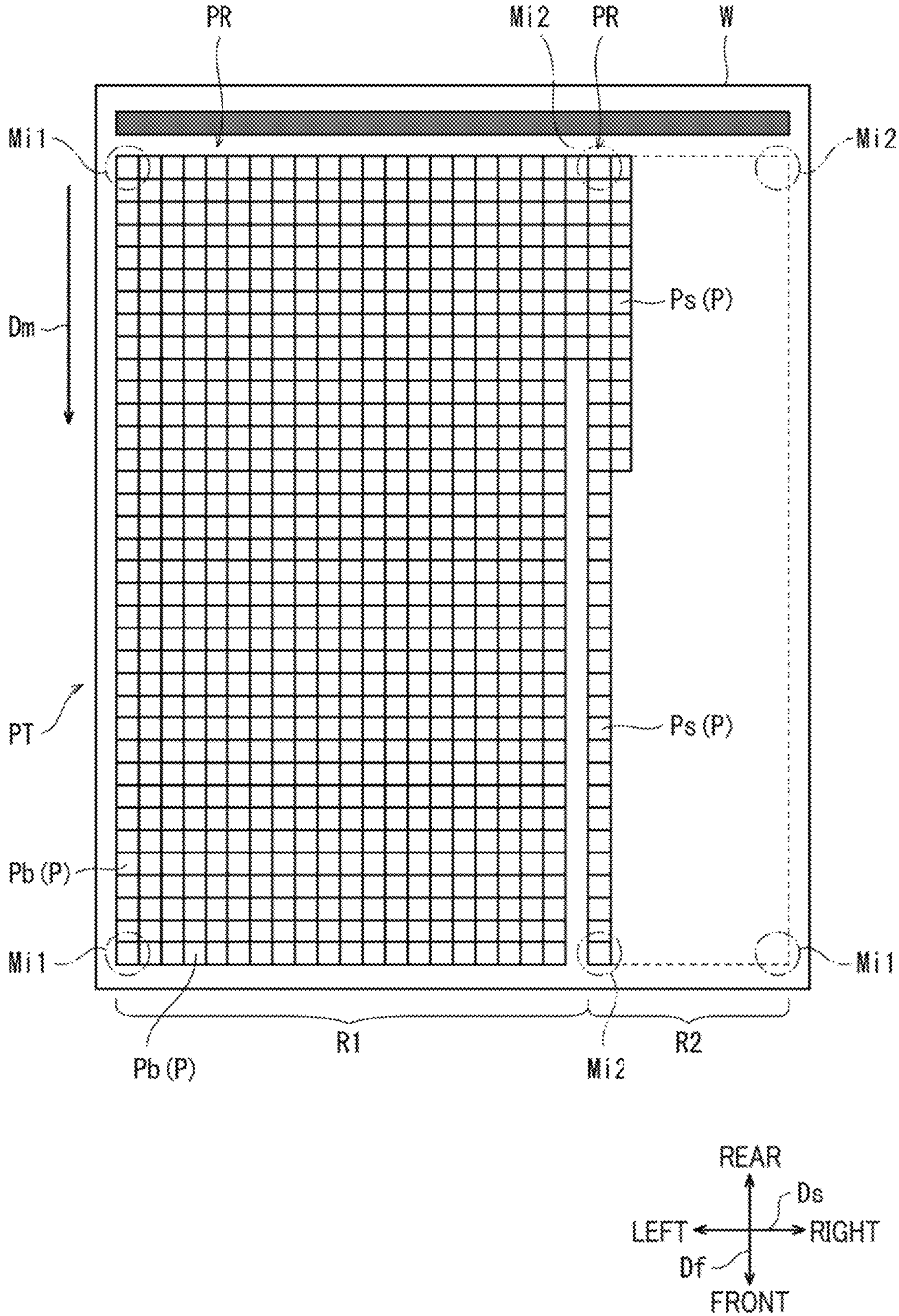
FIG. 4 is an explanatory diagram showing an example of a patch chart printed on a print medium.

The storage 53 stores patch chart data representing a patch chart PT (see FIG. 4). The storage 53 is memory that the arithmetic unit 52 can access. The storage 53 has RAM and ROM. The RAM temporarily stores various data, including data received from the external device 200, such as image data, and data converted by the arithmetic unit 52. The ROM stores a printing program, a color measurement program, prescribed data, and the like for performing various data processes. As an alternative to the storage 53, the printing program and color measurement program may be stored in an external storage medium such as a CD-ROM that is accessible by the arithmetic unit 52.

The arithmetic unit 52 includes a CPU or other processor and at least one circuit, such as an ASIC or other integrated circuit. By performing the printing program and color measurement program, the arithmetic unit 52 controls the components of the printing device 1 to implement a printing operation and other various operations.

The display 14 is a display, for example. In accordance with instructions from the controller 50, the display 14 displays images represented by image data, and the like. The input interface 15 includes buttons and the like, for example, that the user operates. Alternatively, the input interface 15 may be a touchscreen integrated with the display 14.

The controller 50 is electrically connected to the conveying motor 32 of the conveying device 30 via a conveyance drive circuit 33 for controlling the drive of the conveying motor 32. Accordingly, the controller 50 controls conveyance of the print medium W by the conveying rollers 31 of the conveying device 30. The controller 50 is also electrically connected to the scanning motor 43 of the scanning device 40 via a scan drive circuit 46 for controlling the drive of the scanning motor 43. Accordingly, the controller 50 controls movement of the ejection heads 20 by the carriage 41 of the scanning device 40. The controller 50 is further electrically connected to the drive elements 25 via an ejection head drive circuit 26. The controller 50 outputs control signals for the drive elements 25 to the ejection head drive circuit 26, and the ejection head drive circuit 26 generates and outputs drive signals to the drive elements 25 on the basis of these control signals. When driven according to the drive signals, the drive elements 25 eject ink droplets from corresponding nozzles 27.

With the printing device 1 having the above configuration, the controller 50 acquires image data and performs a printing operation based on this image data. In the printing operation, the controller 50 ejects ink onto the print medium W from the ejection heads 20 while moving the ejection heads 20 in the moving direction Ds for each printing pass. Next, the controller 50 conveys the print medium W forward in the conveying direction Df. The printing device 1 repeatedly alternates between a printing pass and a conveying operation in this way to print an image on the print medium W based on the image data.

Figure 3:
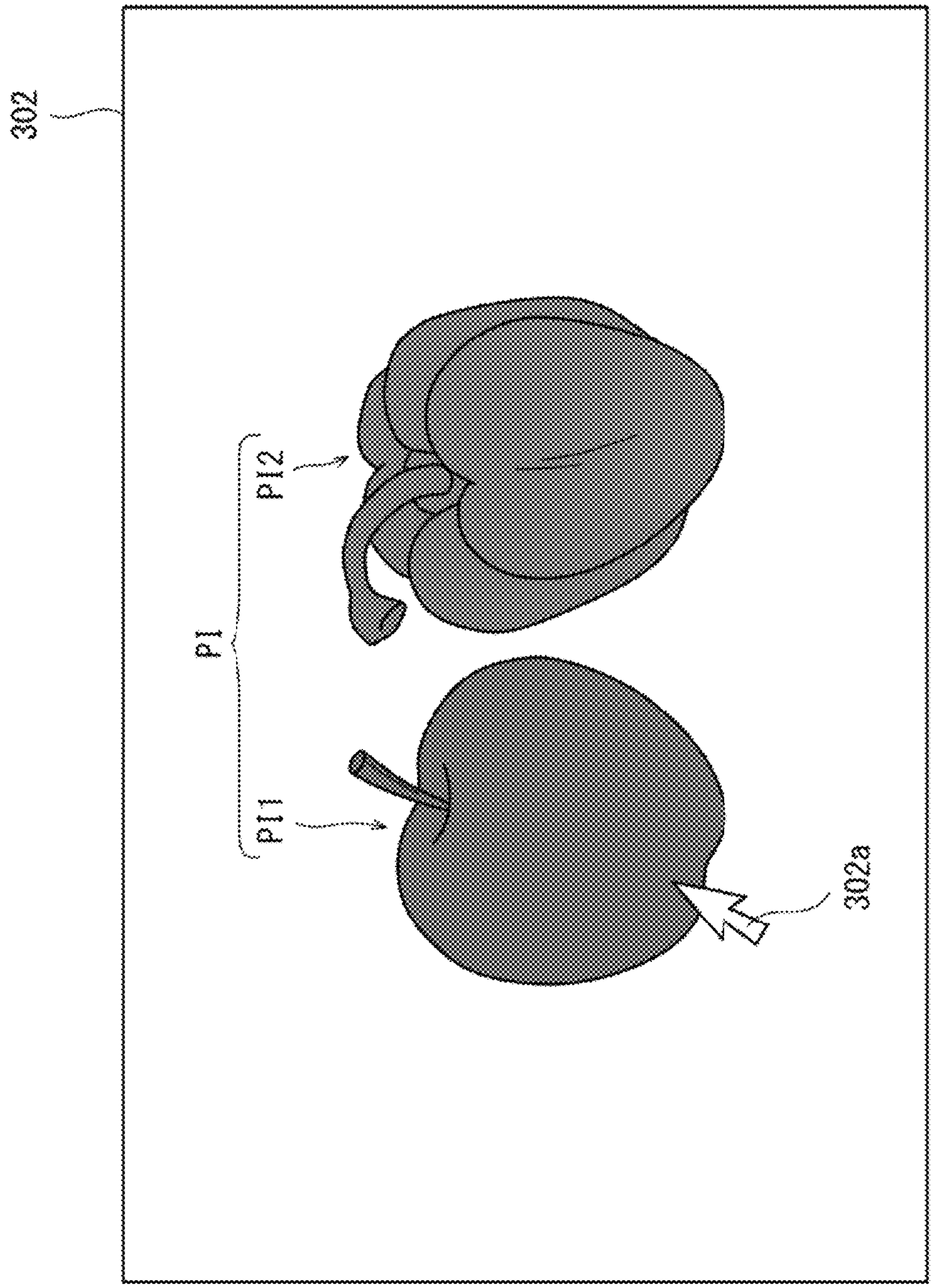
FIG. 3 is an explanatory diagram showing a sample preview image displayed on a user interface and an image designated by a user within the preview image.

FIG. 3 shows a sample preview image PI displayed on the user interface 302 based on image data. The display in FIG. 3 also shows an example of an image designated by a user within the preview image PI.

The CPU 303 in the personal computer 301 displays the preview image PI on the user interface 302 based on image data stored in the storage 305. The preview image PI in the example of FIG. 3 includes an apple preview image PI1 and a bell pepper preview image PI2. When the preview image PI is displayed on the user interface 302, the user specifies an image (pixel) having the color for which the user wishes to create a patch P (a second patch Ps described later). In the example of FIG. 3, the user has moved a pointer 302*a* over the user interface 302 to indicate a pixel in the apple preview image PI1 (desired color in the apple preview image PI1). Information related to the user-specified image is transmitted via the data input/output interface 306 to the controller 50 of the printing device 1.

FIG. 4 shows an example of a patch chart PT printed on a print medium W. A direction Dm indicated in FIG. 4 from the upstream side toward the downstream side in the conveying direction Df denotes a color measuring direction Dm indicating the order in which patch colors are measured.

As shown in FIG. 4, the patch chart PT has a plurality of patches P arranged in the front-rear direction and the left-right direction to form a grid pattern. Thus, the any patch P in the patch chart PT can be defined by its column and row. In this case, the left-right position of a patch P in the patch chart PT is defined by its column and the front-rear position of the patch P is defined by its row. The patch chart PT includes a first patch area R1 in which first patches Pb are arranged, and a second patch area R2 in which second patches Ps are arranged. The second patch area R2 is different from the first patch area R1 and constitutes a margin area adjacent to the first patch area R1 in the moving direction Ds. Each of the first patch area R1 and second patch area R2 is formed in a rectangular shape in a plan view, for example. The patch chart PT includes a plurality of patch columns PR, with each patch column PR having a plurality of patches P aligned linearly in the conveying direction Df Patch columns PR in the first patch area R1 are formed of first patches Pb, while patch columns PR in the second patch area R2 are formed of second patches Ps. In other words, the plurality of patch columns is arranged in parallel, and patches is arranged linearly in each patch column.

The first patches Pb are patches P corresponding to the basic colors in the image data and are arranged at predetermined positions in the patch chart PT. The basic colors are predetermined colors always included in the first patch area R1 of the patch chart PT. The second patches Ps, on the other hand, have colors that the user has specified in the preview image PI described above. Each second patch Ps is a patch P having a color specified by the user in the preview image PI shown in FIG. 3. The second patches Ps are arranged in the second patch area R2 of the patch chart PT. To form second patches Ps, the controller 50 generates raster data that includes the ink color, droplet size, and droplet ejection order (arrangement) for forming patches P corresponding to second patches Ps. The first patches Pb may be referred to as basic patches, while the second patches Ps may be called key patches.

Here, a process must be performed to acquire position information on the patches P in order to measure the color of each patch P. Therefore, a process to acquire position information for each patch column PR is performed prior to measuring the colors of the patches P. This process will be described in detail below.

After printing the patch chart PT with the printing device 1, the user places the print medium W having the printed patch chart PT on the base 202 of the colorimetric device 201. The patch chart PT includes at least three first marker images Mi1 arranged at positions surrounding or within an entire patch area including the first patch area R1 and the second patch area R2, as shown in FIG. 4. In the present disclosure, the phrase "positions surrounding an area or region" represents a concept including positions at an outer boundary of the area or region or/and positions at an outside or/and inside neighborhood of that outer boundary.

Each first marker images Mi1 is an image designating (denoting) a position or region in the first patch area R1. By specifying the first marker images Mi1, the controller 50 can specify the entire patch area including the first patch area R1 and the second patch area R2. Further, because the dimensions in the left-right direction and the front-rear direction of each patch are predetermined and the patches are continuously arranged in the first patch area R1, the controller 50 can specify the position of each patch P located in the first patch area R1 by specifying the first marker images Mi1. The first marker image Mi1 may be a frame of bold black line surrounding a patch P. When the first marker image Mi1 is formed in a region where the patch P is not formed, the first marker image Mi1 may be a bold frame surrounding a portion or region having the same dimensions of the first patch Pin the first patch area R1. The first marker image Mi1 may have a shape of an arrow or a triangle that designates a patch or a region or portion. The first marker image Mi1 may have a specific color other than black.

The user rotates the arm 204 to move the color measuring unit 208 opposite a patch P or portion (or region) designated by each of at least three first marker images Mi1 arranged at positions surrounding or within the entire patch area including the first patch area R1 and the second patch area R2 on the print medium W, as shown in FIG. 4. As in the example of FIG. 4, the first marker images Mi1 may be an image designating a patch P located in the corner of the first patch area R1 forming the left edge and front edge, an image designating a patch P located in the corner of the first patch area R1 forming the left edge and rear edge, and an image designating a portion (or region) positioned in the corner of the second patch area R2 forming the right edge and front edge. The CPU 303 acquires position information on each first marker image Mi1 by specifying the position of the color measuring unit 208 when the color measuring unit 208 opposes a patch or portion (or region) designated by each of the first marker images Mi1 based on the rotated angles of the first link 205 and second link 206 constituting the arm 204. Movement of the arm 204 may be controlled by the CPU 303. The number of first marker images Mi1 may be four or more.

The CPU 303 acquires position information on each first patch Pb in the patch chart PT based on the information on the three first marker positions acquired above. Since the area of the first patch area R1, the area of each patch column PR, and the dimensions of each patch P are all known in this case, the CPU 303 can calculate position information on each first patch Pb simply by acquiring position information on the three first marker images Mi1.

The method of acquiring position information on second patches Ps is essentially the same as that for the first patches Pb. The patch chart PT includes at least three second marker images Mi2 located at positions surrounding or within the second patch area R2. Each second marker images Mi2 is an image designating a position or region in the second patch area R2. By specifying the second marker images Mi2, the controller 50 can specify the second patch area R2. Further, because the dimensions in the left-right direction and the front-rear direction of each patch are predetermined, the controller 50 can specify the position of each patch P located in the second patch area R2 by specifying the second marker images Mi2. The second marker image Mi2 may be a bold frame of black color surrounding a patch P. The combination of shape and color of the second marker image Mi2 may be different from that of the first marker image Mi2 so the user and the controller 50 can distinguish the second marker images Mi2 from the first marker images Mi1. When the second marker image Mi2 is formed in a region where the patch P is not formed, the second marker image Mi2 may be a bold frame surrounding a portion or region having the same dimensions of the second patch P in the second patch area R2. The second marker image Mi2 may have a shape of an arrow or a triangle that designates a patch or a region or portion. The second marker image Mi2 may have a specific color other than black.

The user rotates the arm 204 to move the color measuring unit 208 opposite a patch P or portion (region) designated by each of at least three second marker images Mi2 located at positions surrounding or within the second patch area R2 on the print medium W. As in the example of FIG. 4, the second marker images Mi2 may be an image designating a patch P located in the corner of the second patch area R2 forming the left edge and front edge, an image designating a patch P located in the corner of the second patch area R2 forming the left edge and rear edge, and an image designating a portion or region located in the second patch area R2 forming the right edge and rear edge. The CPU 303 acquires position information on the second marker image Mi2 by specifying the position of the color measuring unit 208 when the color measuring unit 208 opposes a patch or portion (or region) designated by each of the second marker images Mi2 based on the position information on each first marker image Mi1 and the rotated angles of the first link 205 and second link 206 constituting the arm 204. The number of second marker images Mi2 may be four or more. The CPU 303 acquires position information on each second patch Ps in the patch chart PT based on the position information on the three second marker images Mi2 acquired above.

FIG. 5 shows a patch column table Tp that stores patch column information. After acquiring position information on the first patches Pb and second patches Ps in the patch chart PT as described above, the CPU 303 generates a patch column table Tp and stores the patch column table Tp in the storage 305. As shown in FIG. 5, the patch column table Tp stores information for each patch column PR specifying the presence or absence of second patches Ps, the number of patches P arranged in the patch column PR, the starting position of the patch column PR (and specifically, the x coordinate and y coordinate of the patch P positioned on the upstream end of the patch column PR in the color measuring direction Dm), and the ending position of the patch column PR (and specifically, the x coordinate and y coordinate of the patch P positioned on the downstream end of the patch column PR in the color measuring direction Dm). The CPU 303 calculates the position of each patch Pin the patch column PR on the basis of this patch column table Tp. Note that information on the presence or absence of second patches Ps in each patch column PR and the number of patches P arranged in each patch column PR may be stored in the patch column table Tp in advance.

Figure 6:
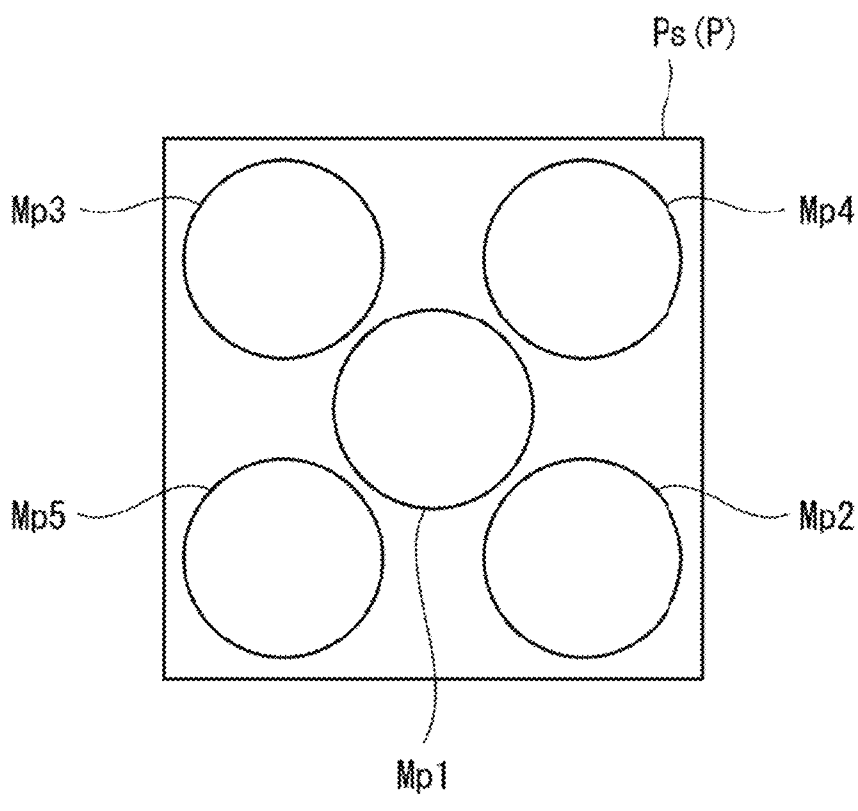
FIG. 6 is an explanatory diagram illustrating a plurality of measurement positions for a single second patch.

Next, the process for measuring a patch P in the patch chart PT will be described. FIG. 6 shows a plurality of measurement positions for a single second patch Ps.

To measure the colors of patches P in the patch chart PT with the colorimetry system 100, the user rotates the arm 204 to move the color measuring unit 208 opposite the patch P to be measured. In this state, the light-emitting element (211) of the color measuring unit 208 irradiates light onto the patch P. The light-receiving element (212) of the color measuring unit 208 receives the light irradiated from the light-emitting element (211) and reflected off the patch P. The color measuring unit 208 measures the color of the patch P based on the light received by the light-receiving element (212).

As shown in FIG. 6, color measurements with the color measuring unit 208 in the present embodiment are performed a plurality of times on each single second patch Ps. For example, the color of one second patch Ps is measured five times while varying the measurement position. In this case, color measurements are performed at five measurement positions Mp1-Mp5 on the second patch Ps. On the colorimetry system 100, the user can move the arm 204 of the colorimetric device 201 to adjust the position of the color measuring unit 208 relative to the second patch Ps. The measurement position Mp1 is located in the center of the second patch Ps, and the measurement positions Mp2-Mp5 are located in the respective four corners of the second patch Ps. The diameter of the area to be measured corresponding to each measurement position is 4-5 mm, for example, or approximately the same as the lens aperture in the light-emitting element (211) of the color measuring unit 208.

In the embodiment, similarly to the second patches Ps, color measurement may be performed at single position for each first patch Pb, or color measurements may be performed at a plurality of measurement positions for each first patch Pb.

The measurement results for all measurement positions are transmitted to the CPU 303 from the colorimetric device 201 via the data input/output interface 306. The CPU 303 receives the results of the plurality of measurements (measured color values) and calculates the averages of the measurement results by dividing the sums of component values of measured color values by the total number of measurements for each of L*, a*, b* components. In the example of FIG. 6, the CPU 303 calculates the averages of component values of the measured color values for each component (each of L*, a*, and b* component) acquired when measuring colors at the measurement positions Mp1-Mp5 for a single second patch Ps. When the color measuring unit 208 is used to measure one second patch Ps four or more times, the CPU 303 may exclude the minimum value and maximum value from the four or more measurement results (four or more measured color values) when calculating the average. As an example, the color measuring unit 208 is controlled to measure one second patch Ps four times, and the CPU 303 calculates, for each component, the average value by totaling the two remaining measurement results after excluding the minimum and maximum values and dividing the sums of the measurement results by 2. This method can suppress any bias in the measured color values. The maximum value and minimum value may be determined on the basis of a distance of each measured color value from the origin in the L*a*b* space. For example, the measured color value having a longest distance from the origin is determined as the maximum value among the measured color values of the second patch Ps. In this case, the CPU 33 calculates, for each component, an average of component values of the color values acquired for one second patch Ps excluding the maximum value and the minimum value. Similarly, the measured color value having a shortest distance from the origin is determined as the minimum value among the measured color values of the second patch Ps. Specifically, the controller 50 calculates the average of the measured color values for a second patch Ps by summing component values of the measured color values excluding the maximum and minimum values for each component and dividing the calculated sum by the number of the color values excluding the maximum and minimum values for each component.

Alternatively, the maximum and minimum values may be determined on the basis of the optical density of each measured color value. An optical density may be calculated from each measured color value. In this case, the measured color value corresponding to the highest optical density among the calculated optical densities from the measured color values of the second patch Ps may be determined as the maximum value, and the measured color value corresponding to the lowest optical density among the calculated optical densities from the measured color values of the second patch Ps may be determined as the minimum value. Alternatively, the maximum and minimum value may be determined on the basis of one component of the L*a*b*. For example, the measured color value having a highest L* component value among L* component values of the measured color values of the second patch Ps may be determined as the maximum value, and the measured color value having a lowest L* component value among L* component values of the measured color values of the second patch Ps may be determined as the minimum value. The maximum and minimum value may be determined on the basis of the a* component values or b* component values.

Figure 8:
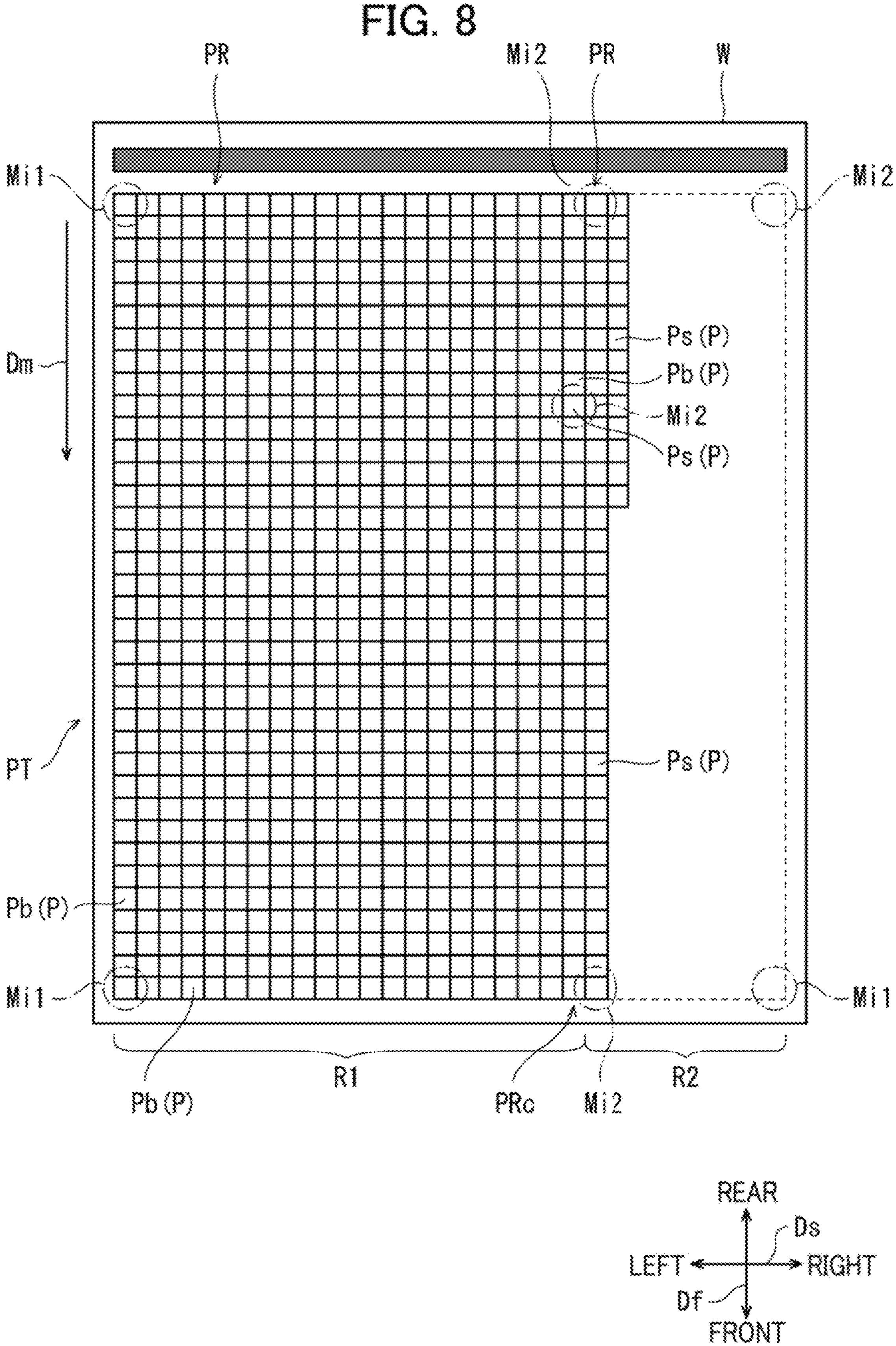
FIG. 8 is an explanatory diagram showing a variation of a patch chart printed on a print medium.
Figure 9:
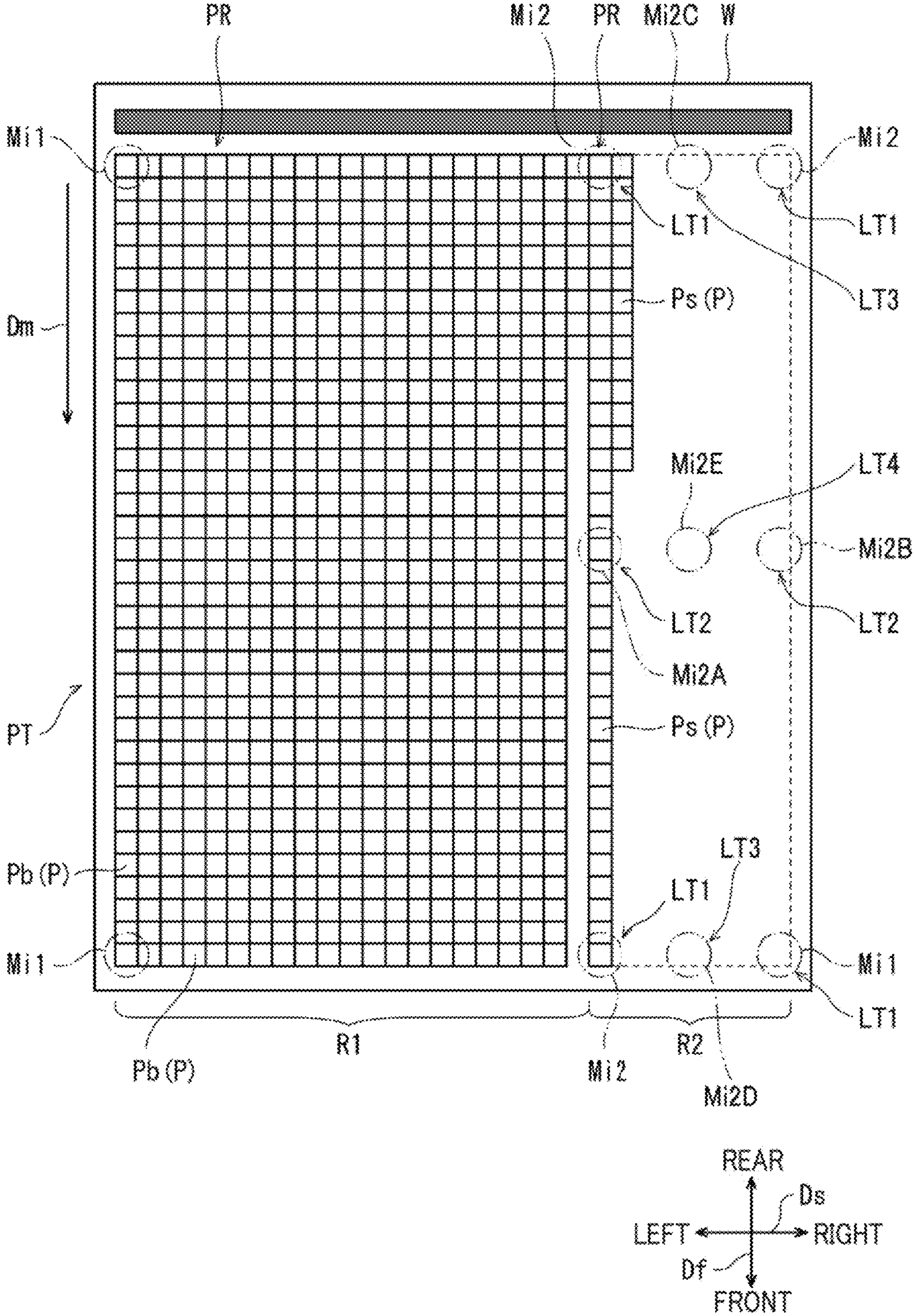
FIG. 9 is an explanatory diagram showing another variation of a patch chart printed on a print medium.
Figure 10:
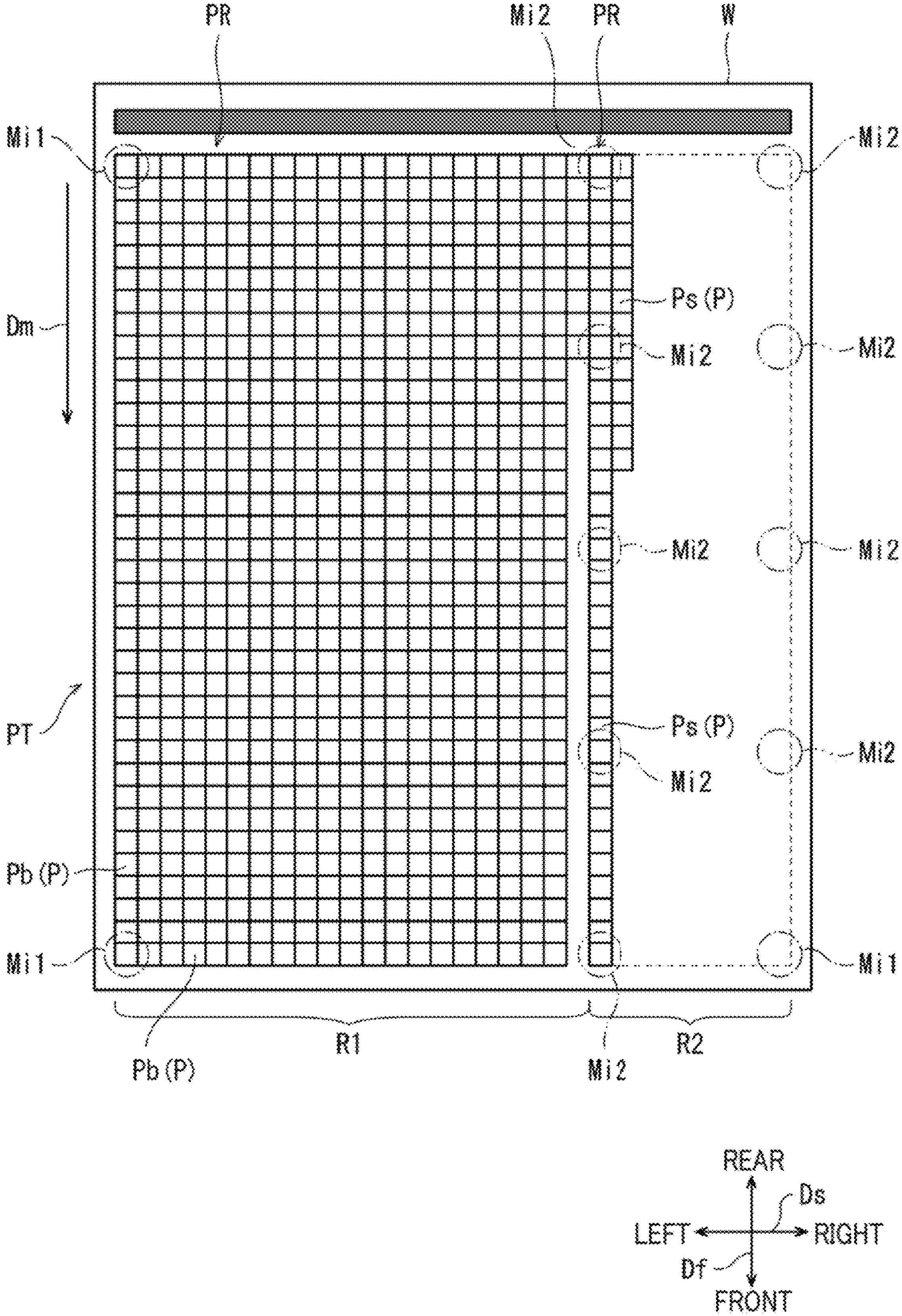
FIG. 10 is an explanatory diagram showing still another variation of a patch chart printed on a print medium for illustrating the number of the first marker images and the number of the second marker images.

In a case that the difference between two of the measured color values acquired while varying the measurement position of the color measuring unit 208 within a single second patch Ps as described above (e.g., the maximum difference among the measured color values at the measurement positions Mp1-Mp5 in FIG. 6) is greater than or equal to a prescribed value, the CPU 303 may reacquire position information on the second patch Ps by specifying again the second marker images Mi2. Here, the difference between the two measured color values may be calculated by a distance between a measured color value of one measurement position and a measured color value of another measurement position in the L*a*b* color space where both two measurement positions are located in a single second patch Ps. When reacquiring the position information, as in the example of FIG. 4, the second marker images Mi2 used for acquiring position information on the second patches Ps may be an image designating the patch P located in the corner of the second patch area R2 forming the left edge and front edge, an image designating the patch P located in the corner of the second patch area R2 forming the left edge and rear edge, and an image designating the portion located in the corner of the second patch area R2 forming the right edge and rear edge or may be patches P different from a part or all of these patches P or portion. In the example of FIG. 4, when reacquiring the position information, the first marker image Mi1 designating the portion located in the corner of the second patch area R2 forming as the right edge and front edge may be used as the second marker image Mi2 instead of or in addition to the image designating the portion located in the corner of the second patch area R2 forming the right edge and rear edge. When the patch chart includes 4 or more second marker image Mi2 as shown in FIGS. 8-10 (described later), when reacquiring position information, the CPU 303 may specify three or more second marker images Mi2 so that the combination of the second marker images Mi2 for reacquiring is different from that for (firstly) acquiring. Position information on the first patches Pb is reacquired when a difference in any of the measured color values acquired while varying the measurement position of the color measuring unit 208 within a first patch Pb is greater than or equal to a prescribed value. Reacquiring the position information on the first patches Pb is performed in the same way as for the second patches Ps.

FIG. 7 shows a table Ta that correlates the color values of patches P with their measured color values (colorimetric values). For each patch P, the table Ta associates a type indicating whether the patch P is a first patch Pb or a second patch Ps with the position, RGB color values, and L*a*b* measured color values of the patch P. The table Ta is stored in the storage 305.

The CPU 303 stores the average calculated for the plurality of measured color values calculated as described above in the table Ta as the measured color value of each second patch Ps. In this way, the average of the plurality of measured color values measured for each second patch Ps is correlated with the color values (input color values) of that second patch Ps. Here, a second patch Ps is a patch P that the controller 50 formed for each color that the user specified in the preview image PI described above. In other words, the table Ta correlates the color value (input color value) of each color in the preview image PI with the average of the measured color values measured for that color. Since the correlation of color values for colors in the preview image PI to the averages of their measured color values changes with each measurement, a new table Ta is effectively generated with each color measurement.

FIG. 8 shows a variation of the patch chart PT in which a new second marker image Mi2 is arranged in the patch chart PT. In the patch chart PT of FIG. 8, the patch columns PR may have a mixed patch column PRc that includes both first patches Pb and second patches Ps in the same column. The first patches Pb are arranged continuously on the upstream side of this mixed patch column PRc in the color measuring direction Dm, and the second patches Ps are arranged continuously downstream in the color measuring direction Dm following the first patch Pb in the mixed patch column PRc that is positioned farthest downstream in the color measuring direction Dm. The patch chart PT also includes the second marker images Mi2 at the same positions of the second marker images Mi2 shown in FIG. 4.

When such a mixed patch column PRc exists, the patch chart P includes a new second marker image Mi2 as well as the second marker images Mi2 located at the same positions as those shown in FIG. 4. Here, the new second marker image Mi2 is an image designating one of the neighboring first patch Pb and second patch Ps in the mixed patch column PRc. That is, the new second marker image Mi2 is an image to specify the boundary between the neighboring first patch Pb and second patch Ps in the mixed patch column PRc. In this case, in the process of acquiring position information on each second marker image Mi2 acquires the position information on the new second marker image Mi2 as well as that of the second marker images Mi2 at the same positions as those shown in FIG. 4. This is accomplished by the user moving the color measuring unit 208 via the arm 204 so that the color measuring unit 208 opposes one of the neighboring first patch Pb and second patch Ps designated by the new second marker image in the mixed patch column PRc. The CPU 303 acquires position information on second marker images Mi2 on the basis of the respective positions of the color measuring unit 208 opposing patches or regions designated by the plurality of second marker images Mi2 including the new second marker image Mi2.

FIG. 9 shows another variation of the second marker images Mi2 in the patch chart PT. As shown in FIG. 9, a plurality of new second marker images Mi2 (Mi2A, Mi2B, Mi2C, Mi2D) may be included in the patch chart PT in addition to the second marker images Mi2 located at the same positions shown in FIG. 4. Specifically, each of new second marker images Mi2A and Mi2B is an image designating the patch Ps or portion (region) at a position LT2 arranged between two corner positions LT1 of the second patch area R2 in the conveying direction Df. Each of new second marker images Mi2C and Mi2D is an image designating the patch Ps or portion (range) at a position LT3 arranged between two corner positions LT1 of the second patch area R2 in the moving direction Ds. The new second marker image Mi2E is an image designating the patch Ps or portion (range) at a position LT4 arranged between two positions LT2 in the moving direction Ds. The new second marker image Mi2E may be an image designating the patch Ps or portion (range) at a position LT4 arranged between two positions LT3 in the conveying direction Df Each position LT2 may be a middle point between the corner positions LT1 in the conveying direction Df. Each position LT3 may be a middle point between the corner positions LT1 in the moving direction Ds. The position LT 4 may be a middle point between the positions LT3 in the conveying direction Df, and a middle point between the positions LT2 in the moving direction Ds.

FIG. 10 shows another example of the number and layout of first marker images Mi1 and second marker images Mi2 in the patch chart PT.

In the present embodiment, the CPU 303 may acquire position information so that the number of acquired second marker positions is greater than the number of acquired first marker positions. In the example of FIG. 10, the number and layout of first marker images Mi1 is identical to that in FIG. 4. The number of first marker images Mi1 is three. However, six new second marker images Mi2 are included in the example of FIG. 8 in addition to the three second marker images Mi2 shown in FIG. 4. The six additional second marker images Mi2 are images designating second patches Ps or portions (regions) at positions surrounding the second patch area R2. The CPU 303 acquires position information on first marker images Mi1 and position information on second marker images Mi2 on the basis of the respective positions of the color measuring unit 208 opposing patches or regions designated by the first marker images Mi1 and second marker images Mi2 arranged in this way. However, the number and layout of first marker images Mi1 and second marker images Mi2 may be set arbitrarily and are not limited to the example in FIG. 10. In the example shown in FIG. 10, the second marker images Mi2 may be arranged in the conveying direction Df at regular intervals.

As shown in FIGS. 8, 9, and 10, the number of first marker images Mi2 is greater than the number of second marker images Mi2 in the patch chart PT.

Second Embodiment

A printing device 1A according to a second embodiment is basically the same as the printing device 1 in the first embodiment but differs from the first embodiment in that the printing device 1A has a built-in colorimetric device 70. The controller 50 in the second embodiment can perform the processes the same as that of the first embodiment. Specifically, the controller 50 in the second embodiment can form the patch charts PT described in the first embodiment or the variations thereof, and perform a process for measuring colors similar to that performed by the CPU 303 in the first embodiment and, hence, a description of these processes has been omitted. In this embodiment, the arithmetic unit 52 corresponds to the computer, the color measurement controlling member, the calculating member, and the generating member. In the following description, structures in the printing device 1A of the second embodiment identical to those in the printing device 1 of the first embodiment are designated with the same reference numerals to avoid duplicating description.

Figure 11:
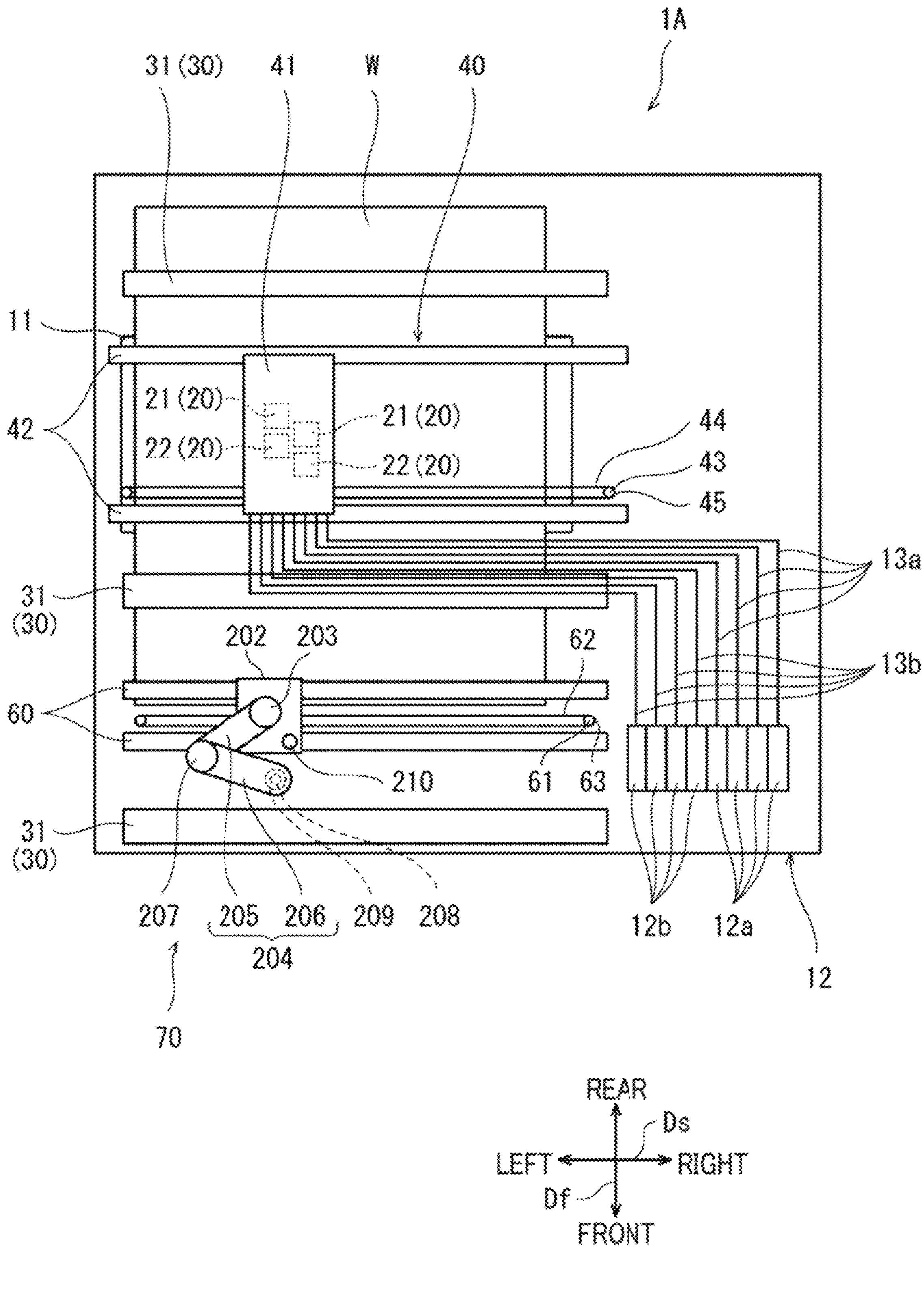
FIG. 11 is a plan view showing a printing device.
Figure 12:
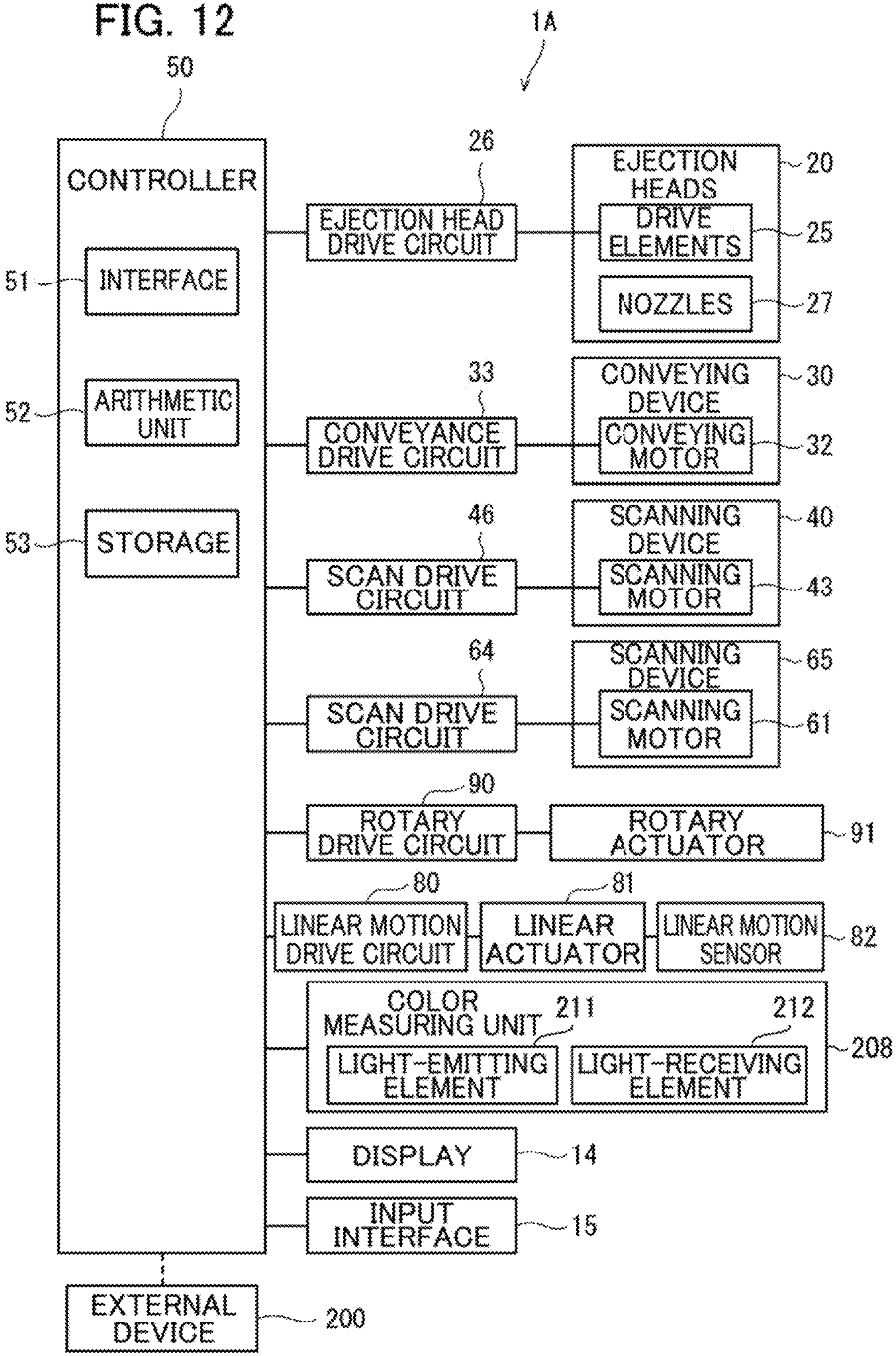
FIG. 12 is a block diagram showing a configuration of the control system shown in FIG. 11.

FIG. 11 is a plan view showing the printing device 1A according to the second embodiment. FIG. 12 is a block diagram showing the configuration of a control system in the printing device 1A of FIG. 11. As shown in FIG. 11, the printing device 1A has, in addition to the structures possessed by the printing device 1, additional conveying rollers 31 having the same function as the conveying rollers 31 in the printing device 1, a pair of guide rails 60, a scanning device 65 (FIG. 12) having a scanning motor 61, an endless belt 62, a pulley 63, and a colorimetric device 70. As with the colorimetric device 201 in the first embodiment, the colorimetric device 70 has the base 202, the first rotary joint 203, the arm 204, the second rotary joint 207, the color measuring unit 208, the prismatic joint 209, and the white reference 210.

The pair of guide rails 60 is arranged downstream of the carriage 41 in the conveying direction Df. The guide rails 60 extend in the moving direction Ds. The additional conveying rollers 31 described above are disposed downstream of the guide rails 60 in the conveying direction Df. The endless belt 62 is attached to the base 202 of the colorimetric device 70. The endless belt 62 extends in the moving direction Ds. The endless belt 62 is also attached to the scanning motor 61 via the pulley 63. When the scanning motor 61 is driven, the endless belt 62 circulates, and the base 202 reciprocates in the moving direction Ds along the guide rails 60. In this way, the base 202 moves the color measuring unit 208 in the moving direction Ds. The base 202 corresponds to the moving member. The size of the base 202 in the second embodiment is smaller than that in the first embodiment. For example, in the second embodiment, the dimension of the base 202 in the left-right direction may be smaller than that of the print medium W. Though in the first embodiment the print medium W is placed on the base 202, in the second embodiment the print medium W is passing through a region below the base 202, and the print medium W is not placed on the base 202.

As shown in FIG. 12, the controller 50 is electrically connected to the scanning motor 61 via a scan drive circuit 64 for controlling the drive of the scanning motor 61. Accordingly, the controller 50 controls movement of the color measuring unit 208 in the moving direction Ds with the base 202. The controller 50 is also connected to a rotary actuator 91 including a motor and the like, for example, via a rotary drive circuit 90. The controller 50 controls rotary motion of the arm 204 with the rotary joints 203 and 207 described above by using the rotary actuator 91.

In order to move the color measuring unit 208 in the up-down direction, the colorimetric device 70 is further provided with a linear motion drive circuit 80, a linear actuator 81 provided on the prismatic joint 209 described above that includes a motor and the like, for example, and a linear motion sensor 82. The linear actuator 81 moves the color measuring unit 208 up and down to place the color measuring unit 208 into contact with and separate from the print medium W. The controller 50 is connected to the linear actuator 81 via the linear motion drive circuit 80, and to the linear motion sensor 82. The linear motion sensor 82 is an encoder, for example, that detects the amount of movement of the linear actuator 81. The controller 50 controls the operations of the linear actuator 81 on the basis of detection results by the linear motion sensor 82, thereby controlling vertical movement of the color measuring unit 208 on the basis of the detection results of the linear motion sensor 82.

Thus, as components for moving the print medium W and the color measuring unit 208 relative to each other, the color measuring unit 208 has the conveying device 30 that conveys the print medium W in the conveying direction Df, the base 202 that moves the color measuring unit 208 in the moving direction Ds, the rotary actuator 91 that moves the color measuring unit 208 in the moving direction Ds and the conveying direction Df, and the linear actuator 81 that moves the color measuring unit 208 in the up-down direction.

Figure 13:
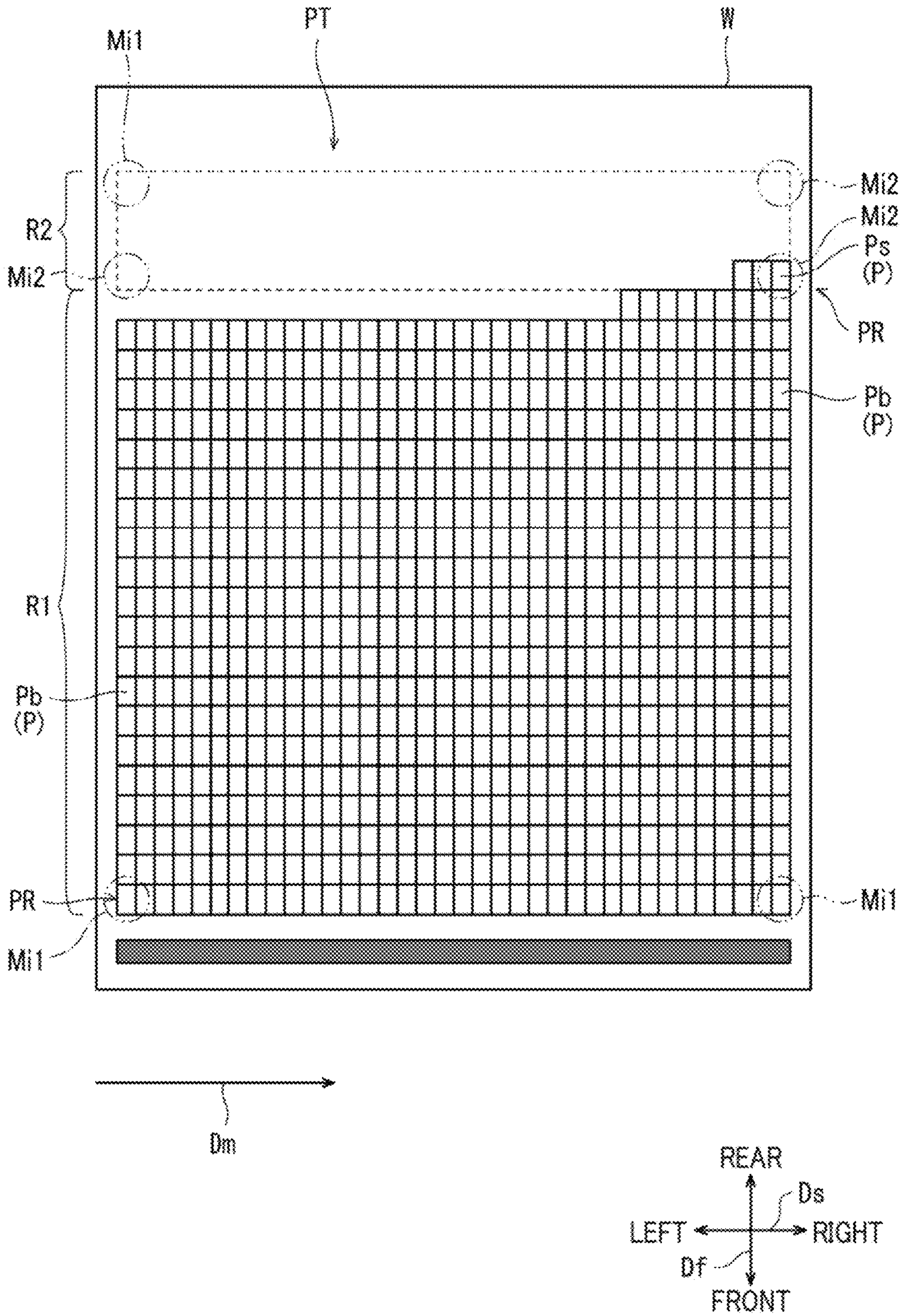
FIG. 13 is an explanatory diagram showing an example of a patch chart printed on a print medium by the printing device shown in FIG. 11.

FIG. 13 shows a sample patch chart PT printed by the printing device 1A on a print medium W. The patch chart PT in FIG. 13 differs from the patch chart PT employed in the colorimetry system 1 of the first embodiment. The color measuring direction Dm in the patch chart PT of FIG. 13 is the direction from one side (the left side) of the moving direction Ds toward the other side (the right side).

As in the first embodiment (FIGS. 4 and 7-10), the positions of patches Pin the patch chart PT of FIG. 13 can be defined by their columns and rows in the second embodiment. However, in the second embodiment, the left-right position of a patch P in the patch chart PT is defined by its row while the front-rear position of the patch P is defined by its column. Further, the first patch area R1 and second patch area R2 of the patch chart PT are adjacent to each other in the conveying direction Df. The second patch area R2 is arranged on the upstream side of the first patch area R1 in the conveying direction Df. The first patches Pb in the first patch area R1 and the second patches Ps in the second patch area R2 are arranged sequentially beginning from the patch on the downstream side in the conveying direction Df and on the right side in the moving direction Ds. This arrangement is implemented for each patch column PR toward the upstream side in the conveying direction Df. The controller 50 start a timer after completion of the image formation of the patch chart PT by the ejection heads 20 to count an elapsed time period from this image formation completion.

The patch chart PT may include at least three first marker images Mi1 and at least three second marker images Mi2 similar to those shown in FIG. 4. For example, the first marker images Mi1 may be an image designating a patch P located in the corner of the first patch area R1 forming the left edge and front edge, an image designating a patch P located in the corner of the first patch area R1 forming the right edge and front edge, and an image designating a portion (or region) positioned in the corner of the second patch area R2 forming the left edge and rear edge. The second marker images Mi2 may be an image designating a patch P located in the corner of the second patch area R2 forming the right edge and front edge, an image designating a portion or region located in the corner of the second patch area R2 forming the left edge and front edge, and an image designating a portion or region located in the second patch area R2 forming the right edge and rear edge. First marker images Mi1 and second marker images Mi2 may be added similarly to FIGS. 7-10.

As illustrated in FIG. 6 of the first embodiment, the controller 50 in the second embodiment controls the color measuring unit 208 to measure the color of a single second patch Ps a plurality of times. In this case, the controller 50 controls the base 202 and arm 204 to move the color measuring unit 208 each time the measuring unit 208 measures a color of the second patch Ps so that the color measuring unit 208 measures the color of the each second patch Ps the plurality of times at positions different from each other. In other words, for each of the plurality of measurements, the controller 50 performs a process to change the measurement position of the color measuring unit 208 inside the same second patch Ps by controlling the base 202 and arm 204. The controller 50 receives results (measured color values) of the plurality of measurements from the color measuring unit 208 (measured color values) and calculates average value from the results. The controller 50 stores the average value calculated for the plurality of measured color values in the table Ta, which is held in the storage 53, as the measured color value of the measured second patch Ps. In this way, the controller 50 correlates an average measured color value for each second patch Ps with the color value (input color value) of that second patch Ps.

Figure 14:
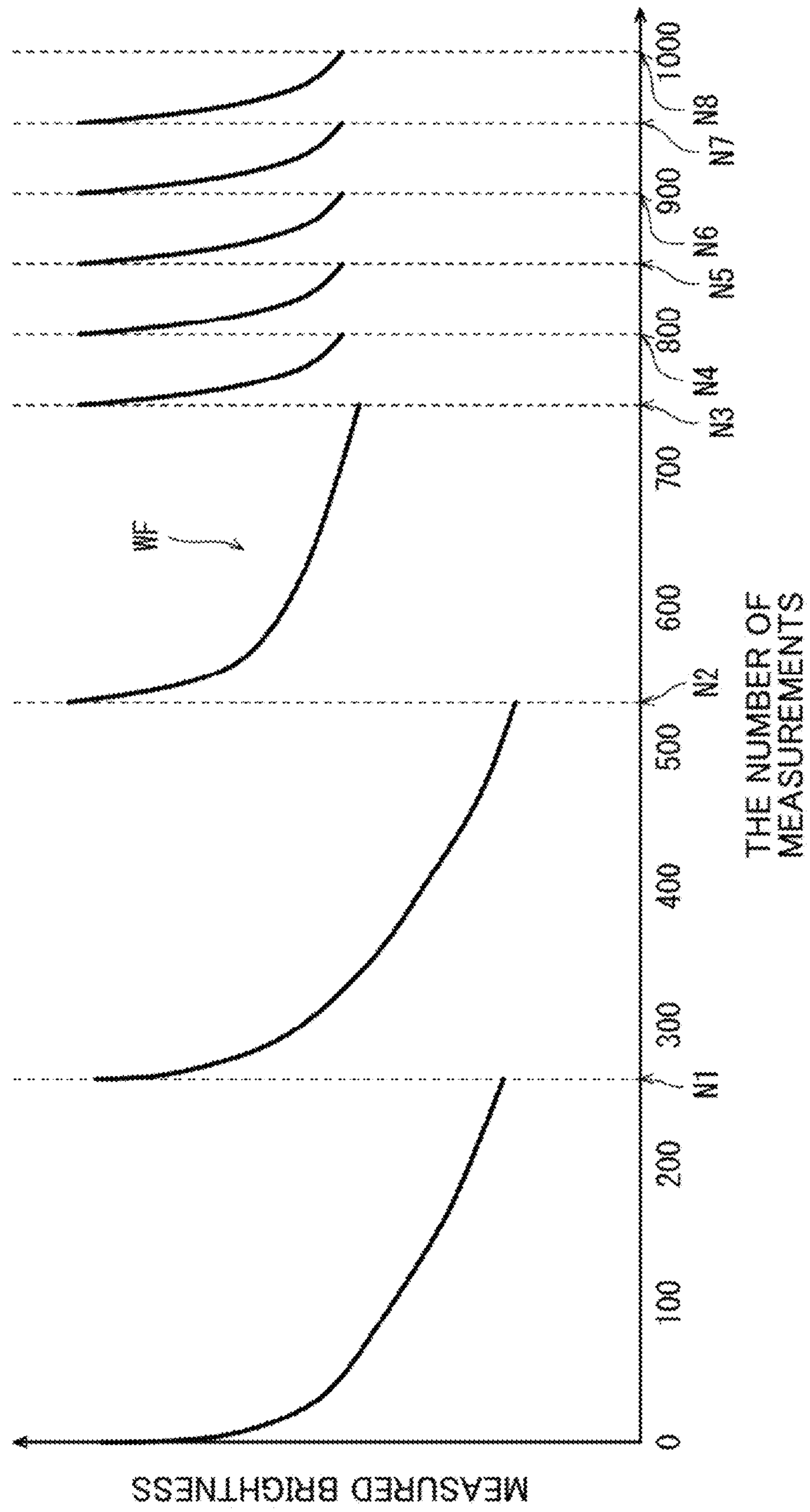
FIG. 14 is a graph showing a relationship between measurement times and measured color values to illustrate calibrations of a color measuring unit.
Figure 15:
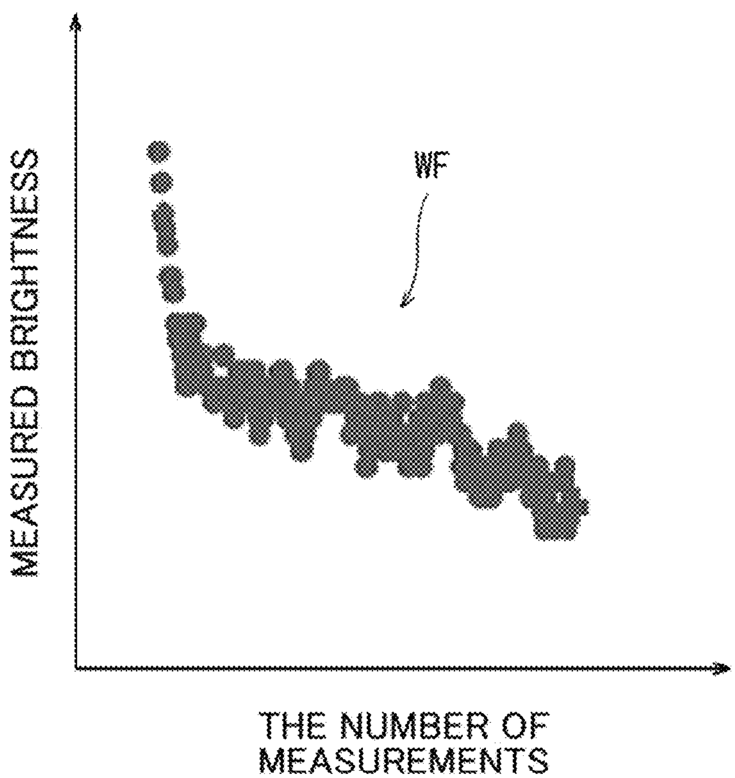
FIG. 15 is a graph showing one waveform of measured color values shown in FIG. 14.

FIG. 14 shows the relationship between measurement times and calibration processes of the color measuring unit 208. FIG. 15 is a graph showing plotted measured color values corresponding to one waveform WF in FIG. 14. While measured color values are expressed as data plotted in a graph, as shown in FIG. 15, FIG. 14 represents this plotted data as a curve for simplification.

When the color measuring unit 208 is controlled to measure the colors of patches P continuously, the brightness of the measured color values decreases due to changes in measurement environment such as increasing of temperature, as illustrated in FIG. 14. Therefore, the controller 50 performs a calibration control process. In the calibration control process, a plurality of calibration processes is to be performed. Each calibration process is to calibrate the color measuring unit 208 to adjust measurement accuracy. The plurality of calibration processes is performed in a manner that a calibration process is performed each time the measurement of the first patches is performed a prescribed first number of times (=N1) since an immediately-previous calibration process has been performed. N1 in FIG. 14 indicates the timing of a firstly-performed calibration process performed after color measurement of first patches Pb has been performed the prescribed first number of times, and N2 indicates the timing of a secondly-performed calibration process performed after color measurement of first patches Pb has been performed the prescribed first number of times following the firstly-performed calibration process.

On the other hand, a thirdly-performed calibration process is performed at a timing N3 that measurements for all the first patches Pb are completed. In this case, the timing N3 is after completing the number of color measurements lower than or equal to the prescribed first number of measurements, which has been used as the reference number for performing the first and secondly-performed calibrations process, in order to calibrate the color measuring unit 208 prior to measuring the colors of second patches Ps (i.e., patches P that are particularly important). In other words, after measurements of all the first patch Pb are completed and before measurements of the second patches Ps is started, a calibration process (thirdly-performed calibration process in this case) is always performed even if the number of measurements is lower than the prescribed first number of measurements since the immediately-previous calibration process has been performed. Because the patches P become second patches Ps from the 730-th patch P in the example of this embodiment, the timing N3 corresponds to the time at which color measurement has been completed for the 729-th first patch Pb.

After each calibration process is completed, the brightness of the measured color values tends to be relatively high up to a prescribed second number of measurements, as illustrated in FIG. 14, after which the brightness of the measured color values tends to be relatively low. Therefore, the color measurement of second patches Ps is measured up to the prescribed second number of times following each calibration process to improve the reliability of the measured color values. In the example of FIG. 14, color measurement of second patches Ps is performed the prescribed second number of times between the calibration process at timing N3 and the calibration process at timing N4 and the prescribed second number of times between the calibration process at timing N4 and the calibration process at timing N5. The process from timing N5 is similar. In other words, the plurality of calibration processes is performed in a manner that a calibration process is performed each time the measurement of the second patch is performed the prescribed second number of times (=N4−N3) since an immediately-previous calibration process has been performed. In other words, in a case that the plurality of calibration processes includes a first calibration process and a second calibration process, and the first calibration process and the second calibration process are performed in this order without a calibration process being performed therebetween, the second calibration processes is performed in a case that the number of times of color measurements performed for the second patches after completion of the first calibration process reaches a prescribed number of times.

Figure 16:
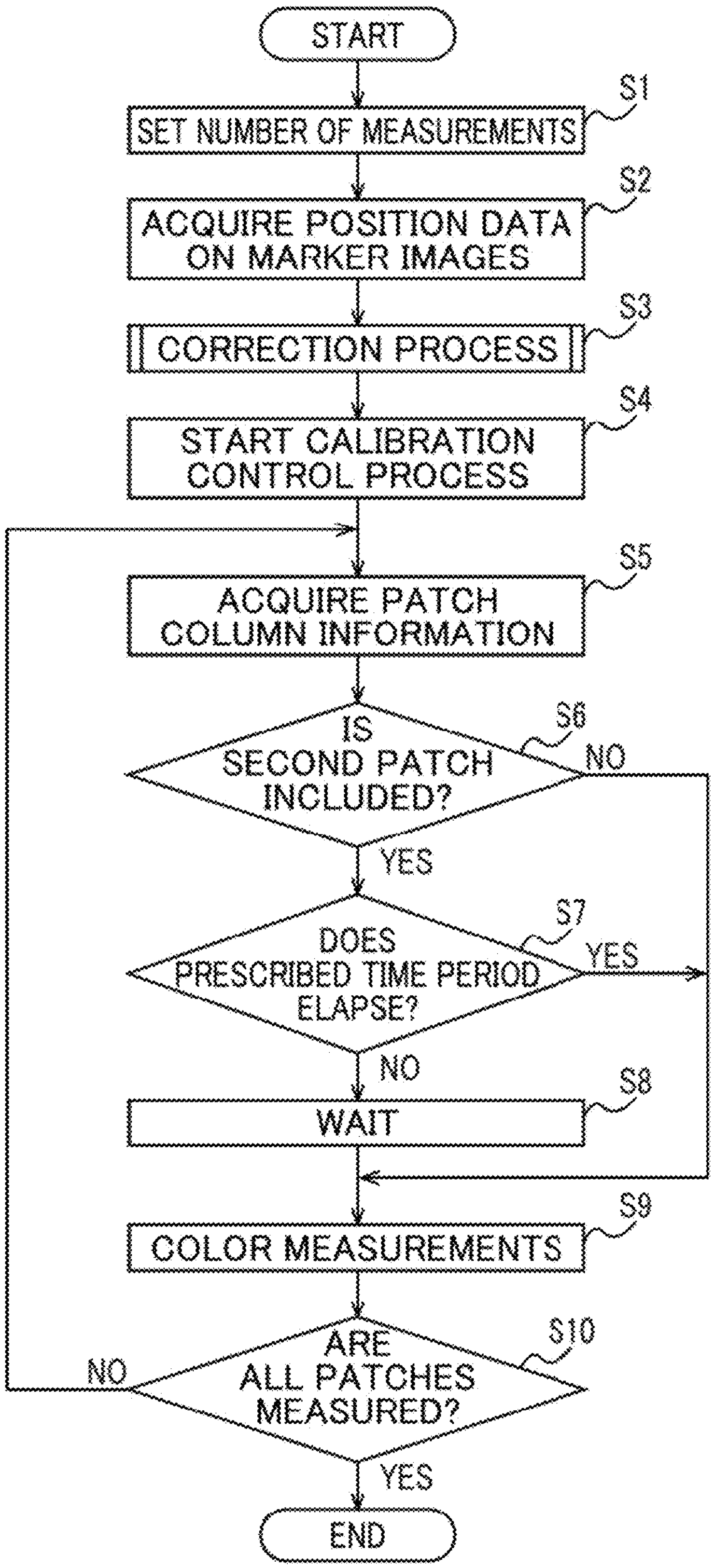
FIG. 16 is a flowchart showing a method of color measurement performed by a controller.
Figure 17:
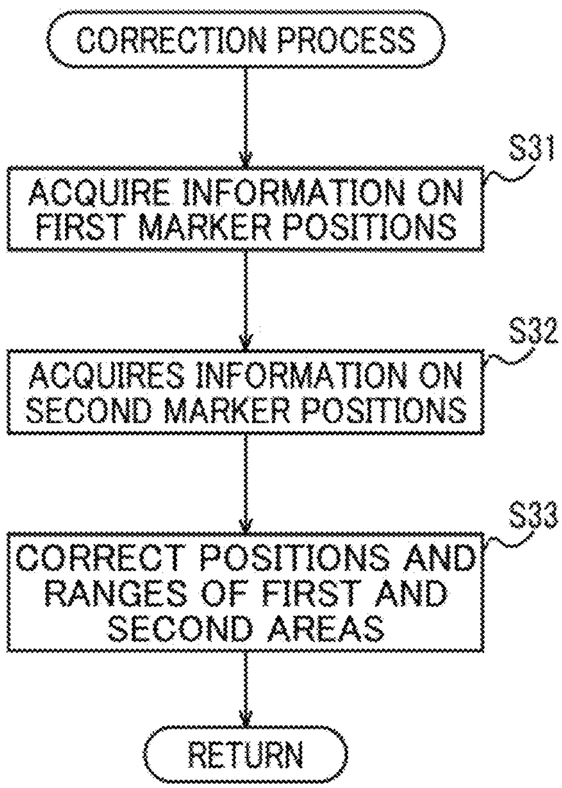
FIG. 17 is a flowchart illustrating a subroutine of a process to correct patch positions shown in FIG. 16.

FIG. 16 is a flowchart showing a method of color measurement performed by the controller 50 according to the present embodiment. FIG. 17 is a flowchart illustrating a subroutine of a process to correct patch positions S3 shown in FIG. 16. The controller 50 performs the process shown in the flowchart of FIG. 16 in response to a user instruction to rewrite the table Ta. Prior to performing the process in FIG. 16, the controller 50 acquires patch creation conditions from the external device 200, input interface 15, or the like. The patch creation conditions may include the size or type of print medium W on which the patches P are to be printed and the size (dimensions) of the patches P, for example. Subsequently, the controller 50 forms the first patches Pb in the patch chart PT based on the above patch creation conditions. The controller 50 also forms the second patches Ps in the patch chart PT by acquiring color information corresponding to user-specified positions in a preview image PI from preview image data representing the preview image PI or original image data from which the preview image data is generated.

As shown in FIG. 16, in S1 the controller 50 first acquires and sets color measuring conditions, including the number of patches P in the patch chart PT, the type of the light-emitting element 211 in the color measuring unit 208, and the viewing angle of the observer, i.e., the user, from the external device 200, the input interface 15, or the like.

In S2 the controller 50 acquires position data. Specifically, the controller 50 acquires position data on the first marker image Mi1 and the second marker images Mi2 for specifying the first patch area R1 and the second patch area R2. The position data on the marker images Mi1 and Mi2 is based on data used and acquired during printing of the patch chart PT, and indicates positions of the maker images Mi1 and Mi2 on the print medium W on which the patch chart PT is printed. The controller 50 specifies the positions of the marker images Mi1 and Mi2 to generate the position data thereon by using a distance in which the print medium is conveyed by the conveying device 30 and a distance of the ejection heads 20 moved by the scanning device 40 when the patch chart PT is printed and stores the position data on these marker images in the storage 53. The controller 50 may specify the positions of the marker images Mi1 and Mi2 by using patch chart image data of the patch chart PT. The controller 50 acquires the position data on the first marker image Mi1 and the first second marker images Mi2 from the storage 53. The controller 50 specifies the first patch area R1 and the second patch area R2 in the print medium on the basis of the acquired position data on the first marker image Mi1 and the second marker images Mi2.

In S2 the controller 50 also acquires data on the second patches Ps. Colors the second patches Ps in the patch chart PT are selected by the user and thus the number of the second patches Ps in the patch chart PT depends on the user's selection. Thus, the controller 50 needs to determine what extent the second patches Ps exist in the second patch area R2. In S2 the controller 50 may acquire, as the data on the second patches Ps, the number of the second patches Ps in the patch chart. Alternatively, the controller 50 may acquire, as the data on the second patches Ps, a position of each second patch Ps that is based on the data used and acquired during printing of the patch chart PT and/or the patch chart image data. On the basis of the acquired data on the second patches Ps, the controller 50 specifies the extent in which the second patches Ps exist in the second patch area R2.

The controller 50 may receive and acquire the position data on the first marker image Mi1 and the second marker images Mi2 and the data on the second patches Ps inputted via the external device 200, the input interface 15, or the like for each patch column PR.

In S3 the controller 50 performs a correction process to acquire positions of the actually printed first marker images Mi1 and second marker images Mi2 to correct positions and ranges of the specified first patch area R1 and second patch area R2 on the print medium W specified in S2. Steps in this correction process are shown in FIG. 17. To begin this process, the controller 50 controls the conveying device 30 to convey the print medium W on which the patch chart PT has been printed by the ejection heads 20 toward the colorimetric device 70.

In S31 of FIG. 17, the controller 50 searches the printed patch chart PT for each first marker image Mi1 by using the color measuring unit 208 on the basis of the acquired position data on the first marker images Mi1. Because each first marker image Mi1 has a predetermined shape and color (a black bold frame in this case), the controller 50 searches the printed patch chart PT for the predetermined shape and color of each first marker image Mi1 on the basis of measured color by the color measuring unit 208 to find the first marker images Mi1. The control device 50 acquires information on first marker positions on the basis of the found first marker images Mi1.

Here, the controller 50 acquires information on each first marker position by controlling the rotary actuator 91 to rotate the arm 204 in order that the color measuring unit 208 opposes in turn a patch or region designated by each of the first marker images Mi1 whose position data is acquired in S2 and controls the linear actuator 81 to move the color measuring unit 208 vertically via the prismatic joint 209 in order to position the color measuring unit 208. The controller 50 acquires information on the first marker position on the basis of the position of the color measuring unit 208 opposing the first marker image Mi1.

In S32 the controller 50 searches the printed patch chart PT for each second marker image Mi2 by using the color measuring unit 208 on the basis of the acquired position data on the second marker images Mi2 and the data on the second patches Ps. Because each second marker images Mi2 has a predetermined shape and color (a black bold frame in this case), the controller 50 searches the printed patch chart PT for the predetermined shape and color of each second marker image Mi2 on the basis of measured color by the color measuring unit 208 to find the second marker images Mi2. The control device 50 acquires information on second marker positions on the basis of the found second marker images Mi2.

In S32 the controller 50 controls the rotary actuator 91 to rotate the arm 204 on the basis of the position data on second patches Ps so that the color measuring unit 208 opposes in turn a patch or region designated by each of the second marker images Mi2 whose position data is acquired in S2 and controls the linear actuator 81 to move the color measuring unit 208 vertically via the prismatic joint 209 in order to position the color measuring unit 208. The controller 50 acquires information on the second marker position on the basis of the position of the color measuring unit 208 opposing the second marker image Mi2.

Here, the number of first marker images Mi2 is greater than the number of second marker images Mi2 in the patch charts PT shown in FIG. 8-10. When one of the patch charts PT shown in FIGS. 8-10 is the subject of the process shown in FIGS. 14 and 15, through the process S31-S32 the controller 50 acquires the position information on the first marker images Mi1 and the second marker images Mi2 so that the number of first marker positions is greater than the number of second marker positions.

In S33 the controller 50 corrects positions and ranges of the first patch area R1 and second patch area R2 specified in S2 on the basis of the position information on first marker images Mi1 and the position information on second marker images acquired in S31 and S32 and the predetermined dimensions of each patch through calculations, and specifies positions of the first patches Pb and the second patches Ps included in the first patch area R1 and the second patch area R2. The controller 50 creates the patch column table Tp shown in FIG. 5 on the basis of the information on the first and second marker positions acquired in S31 and S32 and/or the corrected first patch area R1 and second patch area R2 and the specified positions.

Returning to FIG. 16, in S4 the controller 50 starts the calibration control process to perform a plurality of calibration processes, each calibrating the color measuring unit 208 as shown in FIGS. 14 and 15. Specifically, from this time, the controller 50 performs the following processes in parallel to the processes of S5-S10 described later. That is, the controller 50 starts counting the number of measurements for the first patches Pb and the number of measurements for the second patches Ps which are performed by the color measuring unit 208 (as described later in S9). The controller 50 resets the counted numbers to zero each time the color measuring unit 208 is calibrated. Each time the number of measurements for the first patches Pb is the prescribed first number of times since the immediately-previous calibration process, the controller 50 performs a next calibration process for the color measuring unit 208. After all the measurements of the first patches Pb are completed and before the measurements of the second patches Ps starts, the controller 50 performs a calibration process for the color measuring unit 208. Each time the number of measurements for the second patches Ps is the prescribed second number since the immediately-previous calibration process, the controller 50 performs a next calibration process for the color measuring unit 208.

At the timing of S4, the controller 50 performs a calibration process based on the color measuring conditions acquired in S1.

In S5 the controller 50 selects a patch column among patch columns in the patch chart PT whose colors of patches P have not been measured. The controller 50 selects a patch column while giving priority to each patch column including the first patches Pb only over each patch column including one or more second patches Ps. Accordingly, the controller 50 selects a patch column including one or more second patches Ps, only after all the patch columns each including the first patches Pb only have been measured.

The controller 50 acquires patch column information for the selected patch column from the patch column table Tp described above for one patch column PR indicating whether the patch column PR includes a second patch Ps. In S6 the controller 50 determines whether the patch column PR includes one or more second patches Ps. When the patch column PR includes no second patch Ps (e.g., the patch column PR corresponding to the first column in the patch chart PT; S6: NO), in S9 the controller 50 controls the color measuring unit 208 to measure color of each patch Pin the patch column PR. In this case, the controller 50 measures colors in this patch column PR without waiting for a prescribed time period (described later) to elapse because the patch column PR includes only first patches Pb.

However, when the patch column PR includes one or more second patches Ps (S6: YES), in S7 the controller 50 determines whether the prescribed time period since the patch chart PT was printed on the print medium W has elapsed. Here, the case of a mixed patch column PRc that includes one or more second patches Ps also corresponds to a case in which the patch column PR includes second patches Ps. When the prescribed time period has elapsed since the patch chart PT was printed on the print medium W (S7: YES), the controller 50 controls the color measuring unit 208 to measure colors in the patch column PR. However, when the prescribed time period has not elapsed (S7: NO), in S8 the controller 50 waits for the prescribed time period to elapse and subsequently in S9 controls the color measuring unit 208 to perform color measurements of patches P in the patch column PR. In S9 the controller 50 measures the color of each second patch Ps a plurality of times as shown in FIG. 6 and calculates the average of the measured color values for each color component.

In S10 the controller 50 determines whether color measurements have been completed for all patch columns PR in the patch chart PT. When color measurements have been completed for all patch columns PR (S10: YES), the controller 50 ends the process in FIG. 16. However, when color measurements have not been completed for all patch columns PR (S10: NO), the controller 50 returns to S5 and repeats the process described above for a next patch row.

According to the colorimetry system 100 of the first embodiment and the printing device 1A of the second embodiment described above, the color measuring unit 208 is controlled to measure the color of a single second patch Ps a plurality of times and the average of the color measurement results is calculated. Next, the table Ta is generated to correlate the color value (the input color value) of color in the image with an average measured value as its measured color value for each second patch Ps. Averaging the measurement results in this way can suppress bias in the measured color values for second patches Ps, thereby improving the accuracy of color measurements and the accuracy of color calibration.

In the second embodiment, the controller 50 can reciprocate the base 202 in the moving direction Ds along the guide rails 60 for each of the plurality of color measurements. By moving the color measuring unit 208 in the moving direction Ds in this way, the measurement position of the color measuring unit 208 in one second patch Ps can easily be modified.

When the color of a second patch Ps is measured four or more times in the first and second embodiments, the average value of the color can be calculated from the measurement results after excluding the measured values corresponding to the minimum and maximum. This method can suppress bias in the measured color value.

In the first and second embodiments, position information on each first patch Pb in the patch chart PT is acquired through calculations based on position information on each first marker image Mi1. This method is efficient because the positions of all first patches Pb in the first patch area R1 need not be acquired through measurements.

In the first and second embodiments, position information on each second patch Ps in the patch chart PT is acquired through calculations based on the position information on each second marker image Mi2. This method is efficient because the positions of all second patches Ps in the second patch area R2 need not be acquired through measurements.

In the first and second embodiments, position information on the first patches Pb and second patches Ps may be reacquired (for example, perform the process S3 again) when a difference in measured color values acquired while varying the position of the color measuring unit 208 within the same second patch Ps exceeds a prescribed value. This ensures that more suitable position information on the first patches Pb and second patches Ps can be acquired.

Through the process to acquire position information on each second marker image Mi2 in the first and second embodiments, images designating second patches Ps arranged in four corner positions LT1 of the second patch area R2, and positions LT2, LT3, LT4 in a rectangular region defined by the four corner positions LT1 (see FIG. 9) may be acquired as second marker images Mi2. Through this process, suitable position information can be acquired for the first patches Pb and second patches Ps, even when distortion occurs in the center of the print medium W in the conveying direction Df, for example.

Also, in the process of acquiring position information on each second marker Mi2 in the first and second embodiments, an image designating one of the neighboring first patch Pb and second patch Ps in the mixed patch column PRc (see FIG. 8) may be acquired as a second marker image Mi2. By acquiring position information on this second marker image Mi2 when the placement of second patches Ps begins in the middle of a patch column PR, suitable position information on first patches Pb and second patches Ps can be acquired.

In the first and second embodiments, the number of acquired second marker positions is greater than or equal the number of acquired first marker positions. In this way, more suitable position information can be acquired on second patches Ps, for which color measurements of relatively high accuracy is desired.

In the second embodiment, the controller 50 controls the color measuring unit 208 to begin color measurements after the prescribed time period has elapsed since the patch chart PT was printed on the print medium W. This allows color measurements to be performed after the printed patch chart PT is properly fixed to the print medium W, ensuring that more suitable measured color values can be acquired.

In the second embodiment, color measurement of second patches Ps is performed up to a prescribed number of times after the color measuring unit 208 has been calibrated. This allows second patches Ps to be measured at a time when the brightness of measured color values is relatively high, thereby improving the reliability of measured color values for the second patches Ps.

(Variations)

Figure 18:
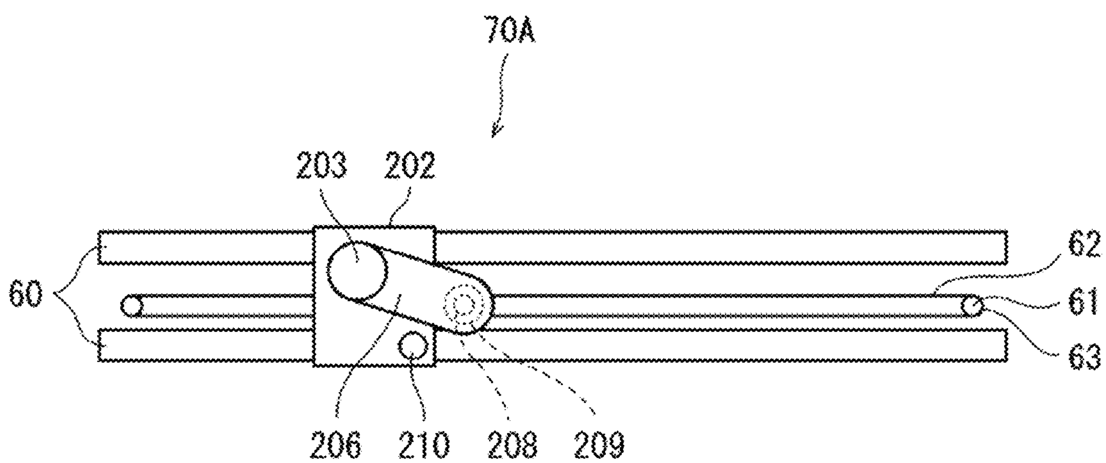
FIG. 18 is a plan view showing a variation of a printing device.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

FIG. 18 shows a colorimetric device 70A as a variation of the colorimetric device 70 in FIG. 11. While the colorimetric device 70 in FIG. 11 employs an arm 204 having two links (the first link 205 and second link 206), the colorimetric device is not limited to this configuration. As shown in FIG. 18, the colorimetric device 70A may employ just the single second link 206. This configuration can reduce the number of components being controlled compared to the colorimetric device 70 of FIG. 11.

In the above embodiments, color measurements are performed without waiting for the prescribed time period to elapse when the patch column PR includes only first patches Pb and are performed after the prescribed time period has elapsed when the patch column PR includes one or more second patches Ps. However, the method of the present invention is not limited to these embodiments. The prescribed time period may include a prescribed first time period for performing color measurements on first patches Pb, and a prescribed second time period longer than the prescribed first time period for performing color measurements on second patches Ps. This method provides not only a wait time for measuring the colors of second patches Ps but also a wait time for measuring the colors of first patches Pb. In this case, the controller 50 determines whether each of the prescribed first time period and prescribed second time period has elapsed since the patch chart PT was printed on the print medium W. The controller 50 controls the color measuring unit 208 to perform color measurements in a patch column PR that includes only first patches Pb after the prescribed first time period has elapsed. The controller 50 controls the color measuring unit 208 to perform color measurements in patch columns PR including one or more second patches Ps (including the mixed patch column PRc) after the prescribed second time period has elapsed.

As described above, the prescribed first time period is shorter than the prescribed second time period. Thus, after the prescribed first time period has elapsed and before the prescribed second time period elapses, the controller 50 controls the color measuring unit 208 to perform color measurements of the first patches Pb only. After the prescribed second time period has elapsed, the controller 50 may start color measurements of the second patch Ps even when the measurement of all the first patches Pb are not completed. That is, after the prescribed second time period has elapsed, the controller 50 may perform color measurements of the first patches Pb and the color measurements of the second patches in an arbitrary order. That is, in a case that the prescribed second time period elapses since the patch chart has been printed on the print medium, the controller 50 may start the measurement process of the second patches Ps even when there remains an unprocessed first patch Pb of the measurement process among the plurality of first patches Pb.

In the first embodiment, after the prescribed time period has elapsed (S7: YES), the controller 50 may start color measurements of the second patch Ps even when the measurement of all the first patches Pb are not completed. In this case, when the controller 50 selects a patch column, the controller 50 may not give priority to each patch column including the first patches Pb only over each patch column including one or more second patches Ps. That is, the controller 50 can select a patch column including one or more second patches Ps prior to selecting a patch column including the first patches Pb only.

While an inkjet printer is offered as an example of the printing devices 1 and 1A in the embodiments described above, the printing devices 1 and 1A may be another printer, such as a laser printer or a thermal printer. A laser printer is provided with a print engine (printing unit). The print engine of a direct tandem laser printer includes an image carrier such as a photosensitive drum or a photosensitive belt, a charging member that charges the image carrier through contact or non-contact, an exposure member that forms an electrostatic latent image on the charged image carrier using a laser semiconductor or the like (known as “exposure”), a toner cartridge or developing cartridge that supplies toner to the image carrier on which an electrostatic latent image has been formed, a transfer member such as a transfer roller or belt that transfers the developed toner image from the image carrier directly to a print medium, and a fixing member such as a fixing roller or belt that thermally fixes the toner transferred onto the print medium. The laser printer is not limited to a direct tandem laser printer but may be an intermediate transfer laser printer. The intermediate transfer laser printer first transfers the developed toner image from the image carrier onto an intermediate transfer belt before using the transfer member to transfer the toner image from the intermediate transfer belt onto the print medium. A thermal printer is also provided with a print engine (printing unit). The print engine of a thermal printer includes a thermal head, and an ink ribbon. The thermal head contacts the ink ribbon and transfers ink in the ink ribbon onto a print medium by generating heat in selected heating elements.

Further, while the printing devices 1 and 1A are serial printers in the embodiments described above, the printing devices 1 and 1A may be line printers, for example.

While each of the colorimetric devices 70 and 70A is provided with one or more links in the above embodiments, the colorimetric device may simply be provided with the prismatic joint 209 on the base 202, without the links. In this case, the color measuring unit 208 is moved in the moving direction Ds by the base 202 and is moved vertically by the linear actuator 81 of the prismatic joint 209.

In the example of FIG. 6 in the above embodiments, an average measured color value is calculated using a plurality of measured color values acquired at measurement positions Mp1-Mp5 in one second patch Ps. The average value is calculated by dividing the sums of measured color component values (component values of measured color values) for each component at the measurement positions Mp1-Mp5 by 5, but the present invention is not limited to this method. For example, the measurement position Mp1 may be weighted more than the measurement positions Mp2-Mp5 because the measurement position Mp1 is more centrally located in the second patch Ps than the measurement positions Mp2-Mp5. Hence, a weighted average may be calculated for the plurality of measured color values when measuring the measurement positions Mp1-Mp5 in a single second patch Ps.

The CPU 303 may acquire position information on each second patch Ps in the patch chart PT on the basis of acquired position information on the three second marker images Mi2 only. Alternatively, the CPU 303 may acquire position information on second patches Ps in the patch chart PT on the basis of the acquired information on the first marker images Mi1 and second marker images Mi2.

In the above embodiments, the controller 50 performs the process according to the flowchart of FIG. 16 in response to a user instruction to rewrite the table Ta. However, the controller 50 may perform the process in FIG. 16 each time a print job is received. That is, the process in FIG. 16 may be performed without the user instruction. In a case that the controller 50 performs the process in FIG. 16 upon reception of a print job, the controller 50 begins printing on a print medium W based on the print job after color measurements are completed for all patch columns PR (S10: YES) and color calibration for printing is performed on the basis of the results of color measurements. Once printing on the print medium W is completed, the controller 50 may end the process of FIG. 16.

What is claimed is:

1. A printing device comprising:

a print head configured to print a patch chart on a print medium, the patch chart including a plurality of patches including a plurality of first patches and one or more second patches, each of the plurality of first patches having a predetermined color, each of the one or more second patches having a user specified color represented by an input color value;

a measuring member configured to measure a color of a patch; and a controller, wherein the patch chart includes:

an entire patch area having a first patch area and a second patch area different from the first patch area, in the first patch area the plurality of first patches being arranged, in the second patch area the one or more second patches being arranged;

at least three first marker images arranged at positions surrounding or within the entire patch area; and at least one second marker image, each of the at least one second marker image being arranged at a position surrounding or within the second patch area in the patch chart, wherein the controller is configured to perform:

a second-patch measurement process to control the measuring member to measure the color of each of the one or more second patches a plurality of times to acquire a plurality of color values for each of the one or more second patches, wherein each of the plurality of color values includes a first component value, a second component value, and a third component value, wherein the second-patch measurement process acquires a plurality of first component values, a plurality of second component values, and a plurality of third component values for each of the one or more second patches by acquiring the plurality of color values for each of the one or more second patches;

calculating an average value of at least two of the plurality of color values for each of the one or more second patches;

generating a table correlating an input color value with the average value as a measured color value for each of the one or more second patches;

acquiring position information on each of the at least three first marker images, the position information on each of the at least three first marker images being based on a position of the measuring member opposing a corresponding first marker image of the at least three first marker images;

acquiring position information on each of the plurality of first patches on the basis of the position information on a corresponding first marker image of the at least three first marker images;

acquiring position information on each of the at least one second marker image, the position information on each of the at least one second marker image being based on a position of the measuring member opposing a corresponding second marker image of the at least one second marker image; and acquiring position information on each of the one or more second patches on the basis of the position information on a corresponding second marker image of the at least one second marker image, wherein the average value includes a first component average value, a second component average value, and a third component average value, wherein the first component average value is an average value of at least two first component values included in the at least two of the plurality of color values for each of the one or more second patches, the second component average value is an average value of at least two second component values included in the at least two of the plurality of color values for each of the one or more second patches, and the third component average value is an average value of at least two third component values included in the at least two of the plurality of color values for each of the one or more second patches.

2. The printing device according to claim 1, further comprising:

a moving member configured to move the measuring member relative to the patch chart, wherein in the second-patch measurement process, the controller is configured to perform controlling the moving member to move the measuring member each time the measuring member measures the color so that the measuring member measures the color of each of the one or more second patches the plurality of times at positions different from each other.

3. The printing device according to claim 1, wherein the number of the plurality of times is greater than or equal to four, wherein the plurality of color values includes a maximum value and a minimum value, wherein the average value of the at least two of the plurality of color values is an average of the plurality of color values excluding the maximum value and the minimum value.

4. The printing device according to claim 1, wherein the controller is configured to further perform:

reacquiring position information on each of the plurality of first patches and position information on each of the one or more second patches when a difference between two of the plurality of color values is greater than or equal to a prescribed value.

5. The printing device according to claim 1, wherein the at least one second marker image includes a first image designating a second patch at a corner of the second patch area, a second image designating an additional second patch at another corner of the second patch area, and a third image designating another additional second patch between the corner and the another corner, wherein the controller is configured to further perform acquiring the position information on: the second patch at the corner of the second patch area; the additional second patch at the another corner of the second patch area; and the another additional second patch between the corner and the another corner.

6. The printing device according to claim 1, wherein the patch chart includes a plurality of patch columns arranged in parallel, patches being aligned linearly in each patch column, wherein the plurality of patch columns includes a mixed patch column including both a first patch of the plurality of first patches and a second patch of the one or more second patches, wherein the at least one second marker image includes an image designating one of the first patch and the second patch included in the mixed patch column, and wherein the controller is configured to further perform acquiring the position information on the at least one second marker image that includes the image designating one of the first patch and the second patch included in the mixed patch column.

7. The printing device according to claim 1, wherein the number of the at least one second marker image is greater than the number of the at least three first marker images, wherein the controller is configured to further perform acquiring the position information on each of the at least three first marker images and acquiring the position information on each of the at least one second marker image such that a number of acquired second marker positions is greater than a number of acquired first marker positions.

8. The printing device according to claim 1, wherein the controller is configured to determine whether a prescribed time period elapses since the patch chart has been printed on the print medium, and wherein the controller is configured to start the second-patch measurement process in a case that the prescribed time period elapses since the patch chart has been printed on the print medium.

9. The printing device according to claim 1, wherein the controller is configured to further perform:

a first-patch measurement process to control the measuring member to measure the color of each of the plurality of first patches, wherein the first-patch measurement process starts in a case that a prescribed first time period elapses since the patch chart has been printed on the print medium, wherein the second-patch measurement process starts in a case that a prescribed second time period elapses since the patch chart has been printed on the print medium, wherein the prescribed second time period is longer than the prescribed first time period.

10. The printing device according to claim 9, wherein in a case that the prescribed second time period elapses since the patch chart has been printed on the print medium, the controller is configured to start the second-patch measurement process even when there remains an unprocessed first patch of the first-patch measurement process among the plurality of first patches.

11. A printing device comprising:

a print head configured to print a patch chart on a print medium, the patch chart including a plurality of patches including a plurality of first patches and one or more second patches, each of the plurality of first patches having a predetermined color, each of the one or more second patches having a user specified color represented by an input color value;

a measuring member configured to measure a color of a patch; and a controller, wherein the controller is configured to perform:

a second-patch measurement process to control the measuring member to measure the color of each of the one or more second patches a plurality of times to acquire a plurality of color values for each of the one or more second patches, wherein each of the plurality of color values includes a first component value, a second component value, and a third component value, wherein the second-patch measurement process acquires a plurality of first component values, a plurality of second component values, and a plurality of third component values for each of the one or more second patches by acquiring the plurality of color values for each of the one or more second patches;

calculating an average value of at least two of the plurality of color values for each of the one or more second patches;

generating a table correlating an input color value with the average value as a measured color value for each of the one or more second patches, and a plurality of calibration processes, each calibration process measuring a color of a reference, wherein the plurality of calibration processes includes a first calibration process, and a second calibration process, the first calibration process and the second calibration process being performed in this order without a calibration process being performed therebetween, wherein the second calibration process is performed in a case that the number of times of color measurements performed for the second patches after completion of the first calibration process reaches a prescribed number of times.

12. A method for measuring colors of a plurality of patches included in a patch chart, the plurality of patches including a plurality of first patches and one or more second patches, each of the plurality of first patches having a predetermined color, each of the one or more second patches having a user specified color represented by an input color value, the method comprising:

performing a second-patch measurement process to control a measuring member to measure a color of each of the one or more second patches a plurality of times to acquire a plurality of color values for each of the one or more second patches, wherein each of the plurality of color values includes a first component value, a second component value, and a third component value, wherein the second-patch measurement process acquires a plurality of first component values, a plurality of second component values, and a plurality of third component values for each of the one or more second patches by acquiring the plurality of color values for each of the one or more second patches;

calculating an average value of at least two of the plurality of color values for each of the one or more second patches;

generating a table correlating an input color value with the average value as a measured color value for each of the one or more second patches; and performing a plurality of calibration processes, each calibration process measuring a color of a reference, wherein the plurality of calibration processes includes a first calibration process, and a second calibration process, the first calibration process and the second calibration process being performed in this order without a calibration process being performed therebetween, wherein the second calibration process is performed in a case that the number of times of color measurements performed for the second patches after completion of the first calibration process reaches a prescribed number of times, wherein the average value includes a first component average value, a second component average value, and a third component average value, wherein the first component average value is an average value of at least two first component values included in the at least two of the plurality of color values for each of the one or more second patches, the second component average value is an average value of at least two second component values included in the at least two of the plurality of color values for each of the one or more second patches, and the third component average value is an average value of at least two third component values included in the at least two of the plurality of color values for each of the one or more second patches.

* * * * *